(12) United States Patent
Akahira

(10) Patent No.: US 6,645,029 B2
(45) Date of Patent: Nov. 11, 2003

(54) COLOR FILTER PRODUCING METHOD AND APPARATUS

(75) Inventor: Makoto Akahira, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 437 days.

(21) Appl. No.: 09/788,406

(22) Filed: Feb. 21, 2001

(65) Prior Publication Data

US 2001/0028916 A1 Oct. 11, 2001

(30) Foreign Application Priority Data

Feb. 21, 2000 (JP) ........................................ 2000-042397

(51) Int. Cl.⁷ ................................................ B41J 2/21
(52) U.S. Cl. ........................ 445/24; 427/165; 427/168; 347/19
(58) Field of Search .............................. 445/24; 427/165, 427/168; 347/19

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 347/140 R |
| 4,463,359 A | 7/1984 | Ayata et al. | 346/1.1 |
| 4,558,333 A | 12/1985 | Sugitani et al. | 346/140 R |
| 4,608,577 A | 8/1986 | Hori | 346/140 R |
| 4,723,129 A | 2/1988 | Endo et al. | 346/1.1 |
| 4,740,796 A | 4/1988 | Endo et al. | 346/1.1 |
| 5,116,150 A * | 5/1992 | Courtney | 400/320 |
| 6,511,545 B2 * | 1/2003 | Banno et al. | 118/688 |
| 6,514,559 B1 * | 2/2003 | Miyamoto et al. | 427/78 |
| 6,579,139 B1 * | 6/2003 | Mishima et al. | 445/24 |

FOREIGN PATENT DOCUMENTS

| | | | |
|---|---|---|---|
| EP | 717428 | * | 6/1996 |
| EP | 0756933 | | 2/1997 |
| EP | 866486 | * | 9/1998 |
| JP | 056847 | | 5/1979 |
| JP | 123670 | | 7/1984 |
| JP | 138461 | | 8/1984 |
| JP | 071260 | | 4/1985 |
| JP | 101412 | | 4/1997 |
| JP | 09-277571 | * | 10/1997 |

OTHER PUBLICATIONS

Hasegawa et al, Progress in Development of Color Filters by Ink Jet Printing, FMC3–4, pp 299–302 (IDW 1998).*

* cited by examiner

Primary Examiner—Kenneth J. Ramsey
(74) Attorney, Agent, or Firm—Fitzpatrick, Cella, Harper & Scinto

(57) ABSTRACT

Disclosed are color filter producing method/apparatus for producing a color filter by ejecting onto a substrate ink from an ink-jet head having a plurality of nozzles arranged substantially in a first direction while relatively scanning the ink-jet head and the substrate in a second direction substantially perpendicular to the first direction, so that filter elements adjacent in the second direction may be colored to have different colors. In the method/apparatus, before the coloring, landing locations for the plural ink dots to be ejected to color the filter elements, are measured and based on the measurement results, ejection timings for the plural nozzles are adjusted so that the plural ink dots land along the center line of each of the filter elements in the first direction.

Therefore, it is possible to provide a color filter producing method whereby, during the production of a color filter using the ink-jet method, the occurrence of color mixing can be reduced, and to provide an apparatus therefor.

24 Claims, 33 Drawing Sheets

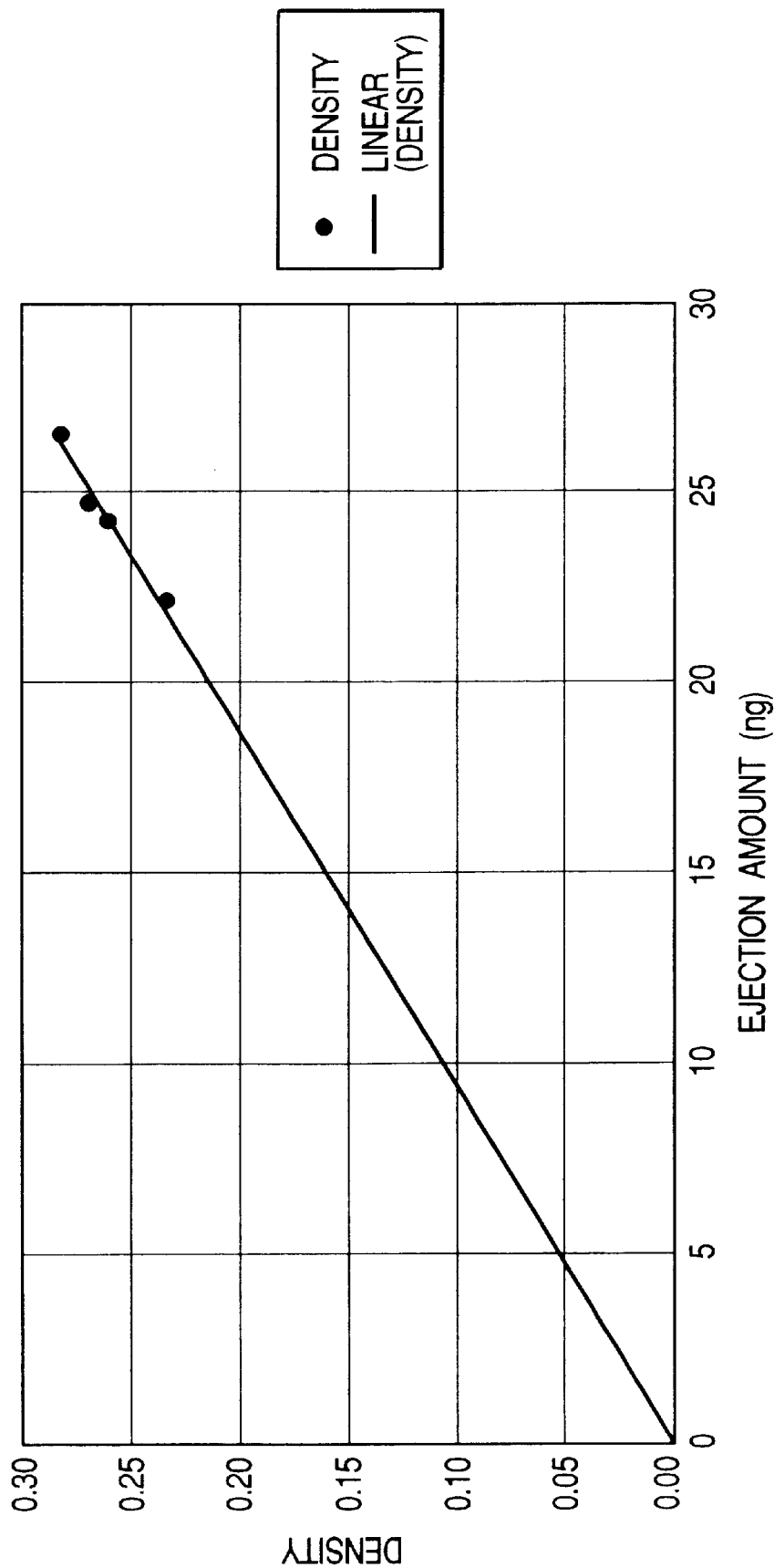

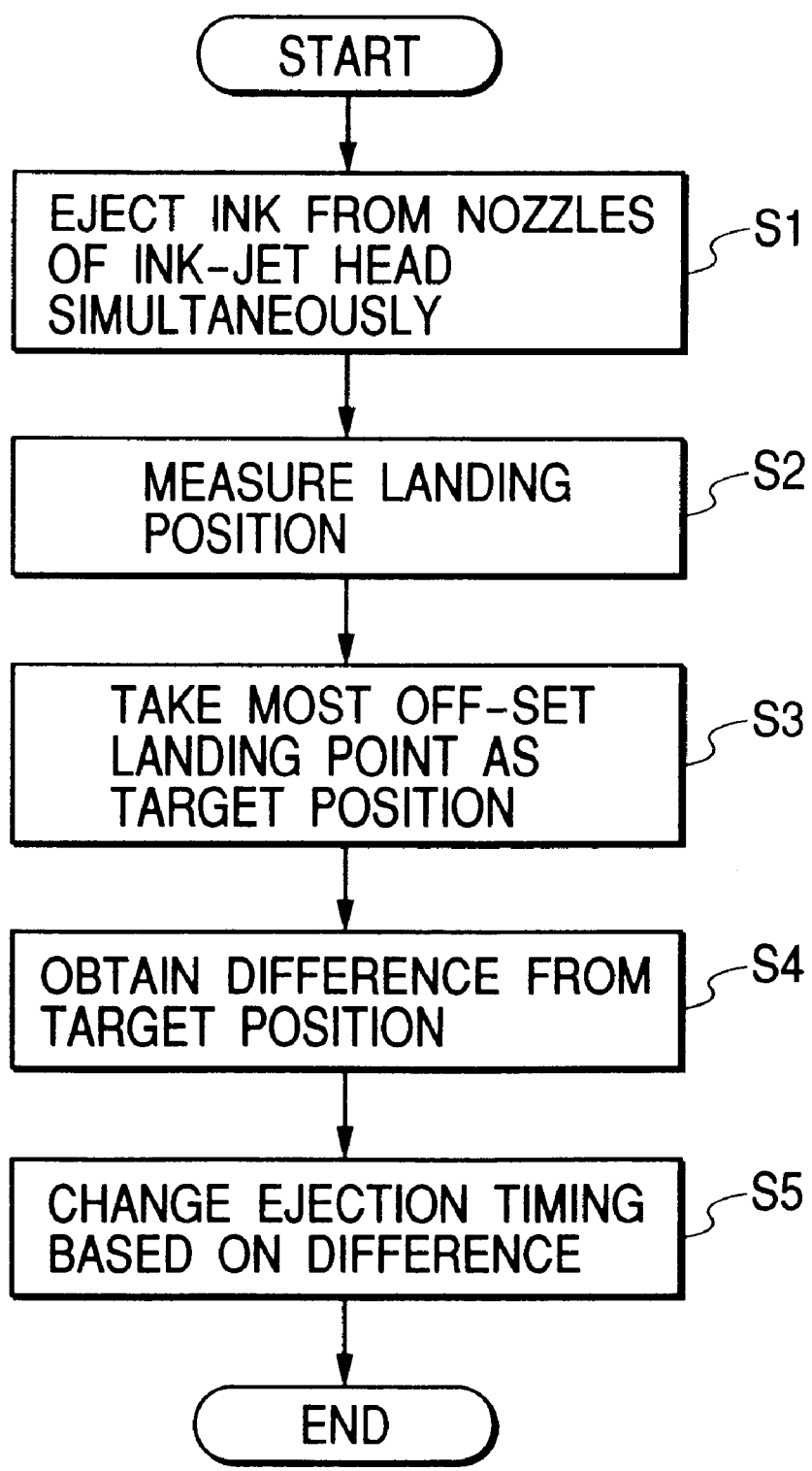

NOZZLE
HEAD

ACTUAL LANDING POSITIONS

TARGET LANDING POSITIONS

RELATIONSHIP BETWEEN EJECTION AMOUNT AND DRIVE VOLTAGE

FIG. 25

PARAMETERS OF PRODUCING CONDITIONS TO BE CHANGED BY TYPE CHANGE OF COLOR FILTER

| | AVAILABLE NOZZEL RANGE | SCAN DISTANCE | NUMBER OF TIMES OF SCANS | SUB-SCAN AMOUNT | EJECTION AMOUNT |
|---|---|---|---|---|---|
| CHANGE NUMBER OF PIXELS (VGA → SVGA → XGA) | — | — | CHANGE | CHANGE | CHANGE |
| CHANGE NUMBER OF SCREEN SIZE (10 → 12.1 → 14.1) | CHANGE | CHANGE | (CHANGE) | (CHANGE) | CHANGE |
| COLOR DENSITY | — | — | CHANGE | CHANGE | (CHANGE) |

FIG. 26

RELATIONSHIP BETWEEN SCREEN SIZE AND NUMBER OF PIXELS

| NUMBER OF PIXELS / SIZE | VGA 640×480 | SVGA 800×600 | XGA 1024×768 | SXGA 1280×1024 | UXGA 1600×1280 |
|---|---|---|---|---|---|
| 10.4 | 110×330 μm 230dpi | 88×264 μm 289dpi | 69×207 μm 368dpi | | |
| 11.3 | 120×360 μm 212dpi | 96×288 μm 265dpi | 75×225 μm 339dpi | | |
| 12.1 | 128×384 μm 198dpi | 102.5×307.5 μm 248dpi | 80×240 μm 318dpi | | |
| 13.3 | 140×420 μm 181dpi | 112×336 μm 227dpi | 88×264 μm 289dpi | 71×213 μm 358dpi | |
| 14.1 | 150×450 μm 169dpi | 120×360 μm 212dpi | 93×279 μm 273dpi | 75×225 μm 339dpi | |
| 15 | | | 100×300 μm 254dpi | 78×234 μm 236dpi | 64×192 μm 397dpi |
| 18 | | | 119×357 μm 213dpi | 93×279 μm 273dpi | 76×228 μm 334dpi |
| 20 | | | 133×399 μm 191dpi | 103×309 μm 247dpi | 85×255 μm 299dpi |

UPPER : PIXEL WIDTH
LOWER : RESOLUTION

EQUAL PITCH

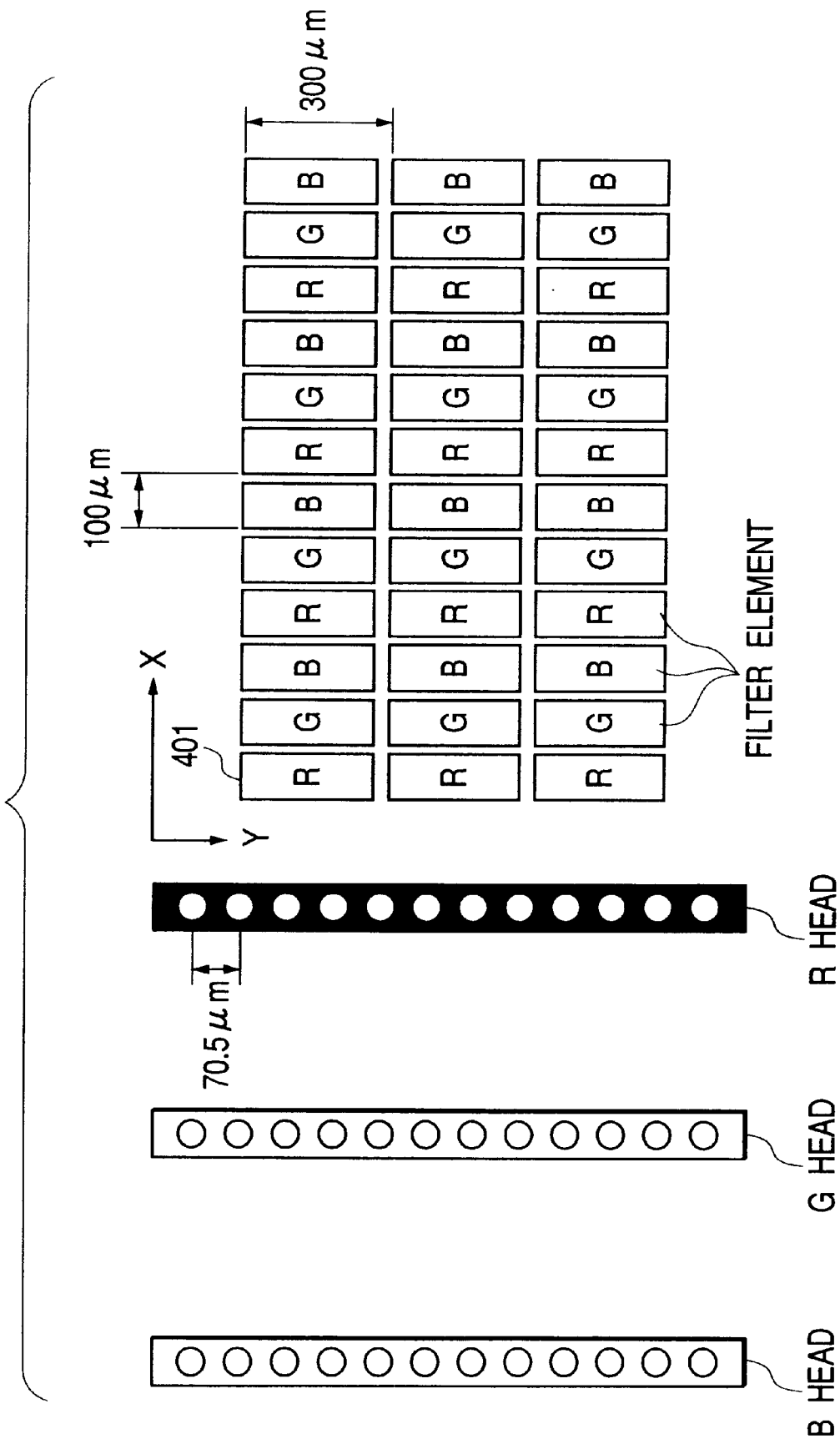

R G G B B R R G G B B R ← TARGET EJECTION POSITION

R, G, B: EJECT INKS FROM NOZZLES CORRESPONDING TO RESPECTIVE PIXEL AREAS AT ABOVE-INDICATED TIMINGS

R, G: EJECT INKS FROM NOZZLES CORRESPONDING TO RESPECTIVE PIXEL AREAS AT ABOVE-INDICATED TIMINGS
G, B: EJECT INKS FROM NOZZLES CORRESPONDING TO RESPECTIVE PIXEL AREAS AT ABOVE-INDICATED TIMINGS

The present invention relates to a color filter producing

COLOR FILTER PRODUCING METHOD AND APPARATUS

BACKGROUND OF THE INVENTION

1. Field of the Invention

The present invention relates to a color filter producing method and apparatus, a color filter for a liquid crystal display, and a liquid crystal display device and an apparatus that employs the liquid crystal display device.

2. Related Background Art

For the production of a color filter using the ink-jet method, a color filter producing method is disclosed in Japanese Patent Laid-open Publication No. 9-101412. According to this method, three heads for ejecting colored inks, R, G and B, are prepared to color individual filter elements with R, G or B ink. As is shown in FIG. 33, when the heads and the substrate relatively scan in direction X, each filter element in direction Y is so colored as to have the same ink color, and adjacent filter elements in direction X (the main scanning direction) are so colored to have different ink colors. With this method, since the nozzle pitch need not match the distance between the filter elements, the time required for adjustments before beginning the filling process can be reduced.

As is described above, by using the coloring method disclosed in Japanese Patent Laid-open Publication No. 9-101412, adjacent filter elements in the main scanning direction are colored with different colors. Thus, when the ink is ejected while relatively scanning the heads and the substrate in direction X (main scanning direction), and when the landing location of ejected ink is shifted in the main scanning direction, ejected ink be deposited in adjacent filter elements and color mixing may occur. Therefore, the present inventor found that the landing location of ejected ink is especially important when this coloring method is employed. As a result of a serious study, it was found that to reduce color mixing it is preferable that the shifting of landing locations in direction X be eliminated.

SUMMARY OF THE INVENTION

To resolve this problem, it is one object of the present invention to provide a color filter producing method and a color filter producing apparatus whereby the shifting of ejected ink dot landing locations is eliminated and the occurrence of color mixing is reduced in case a color filter is produced by ejecting ink while a head and a substrate relatively scan in direction X (the main scanning direction), and whereby adjacent filter elements are colored with different colors.

To achieve the above object of the present invention, there is provided a color filter producing method for producing a color filter by ejecting onto a substrate ink from an ink-jet head having a plurality of nozzles arranged substantially in a first direction while relatively scanning the ink-jet head and the substrate in a second direction substantially perpendicular to the first direction, so that filter elements adjacent in the second direction may be colored to have different colors, the method comprising:

a main scanning step of relatively scanning the ink-jet head and the substrate in the second direction;

a coloring step of ejecting inks, during the main scanning, from plural different nozzles of the ink-jet head, and coloring the filter elements with the plural ink dots; and an adjustment step of measuring, before the coloring, landing locations for the plural ink dots to be ejected to color the filter elements, and of employing the measurement results to adjust the difference of the landing locations, wherein, at the adjustment step, the positioning difference in the second direction is measured, and ejection timings for the plural nozzles are adjusted so that the plural ink dots land along the center line of each of the filter elements in the first direction.

Further, according to the present invention, there is provided a color filter producing apparatus for producing a color filter by ejecting onto a substrate ink from an ink-jet head having a plurality of nozzles arranged substantially in a first direction while relatively scanning the ink-jet head and the substrate in a second direction substantially perpendicular to the first direction, so that filter elements adjacent in the second direction may be colored to have different colors, the apparatus comprising:

main scanning means for relatively scanning the ink-jet head and the substrate in the second direction;

coloring means for ejecting inks, during the main scanning, from plural different nozzles in the ink-jet head, and for coloring the filter elements with plural ink dots; and adjustment means for measuring landing locations for the plural ink dots to be ejected to color the filter elements, and for employing the measurement results to adjust the difference of the landing locations, wherein the adjustment means performs the adjustment before the filter elements are colored by the control means, and wherein the adjustment means measures the positioning difference in the second direction, and adjusts ejection timings for the plural nozzles so that the plural ink dots land along the center line of each of the filter elements in the first direction.

According to the present invention, there is provided a method for producing a display device having a color filter, the color filter being produced by ejecting on a substrate ink from an ink-jet head having a plurality of nozzles arranged substantially in a first direction, while relatively scanning the ink-jet head and the substrate in a second direction substantially perpendicular to the first direction so that filter elements adjacent in the second direction may be colored to have different colors, the method comprising:

a preparing step of preparing a color filter produced by executing a main scanning step of relatively scanning the ink-jet head and the substrate in the second direction, a coloring step of ejecting ink, during the main scanning step, from plural different nozzles of the ink-jet head, and coloring the filter elements with the plural ink dots, and an adjustment step of measuring, before the coloring step, landing locations for the plural ink dots to be ejected to color the filter elements, and of employing the measurement results to adjust the difference of the landing locations, wherein the adjustment step includes the steps of measuring the positioning difference in the second direction, and adjusting ejection timings for the plural nozzles so that the plural ink dots land along the center line of each of the filter elements in the first direction; and an integrating step of integrally forming a light quantity varying means and the color filter.

According to the present invention, there is provided a method for producing an apparatus including a display device having a color filter, the color filter being produced by ejecting on a substrate ink from an ink-jet head having a plurality of nozzles arranged substantially in a first direction, while relatively scanning the ink-jet head and the substrate in a second direction substantially perpendicular to the first direction so that filter elements adjacent in the second direction may be colored to have different colors, the method comprising:

a preparing step of preparing a display device integrally forming therein a light quantity varying means and a color filter produced by executing a main scanning step of relatively scanning the ink-jet head and the substrate in the second direction, a coloring step of ejecting ink, during the main scanning step, from plural different nozzles of the ink-jet head, and coloring the filter elements with multiple ink dots, and an adjustment step of measuring, before the coloring step, landing locations for the plural ink dots to be ejected to color the filter elements, and of employing the measurement results to adjust the differing of the landing locations, wherein the adjustment step includes the steps of measuring the positioning difference in the second direction, and adjusting ejection timings for the plural nozzles so that the plural ink dots land along the center line of each of the filter elements in the first direction; and a connecting step of connecting, to the display device, an image signal supply means for transmitting an image signal to the display device.

BRIEF DESCRIPTION OF THE DRAWINGS

FIG. 12 is a graph showing the relationship between the density of an ink dot and the amount of ejected ink;

FIG. 13 is a flowchart showing the processing performed to adjust an ink landing position;

FIG. 25 is a diagram showing what production conditions should be changed when the color filter type is changed;

FIG. 26 is a diagram showing information concerning the screen size of a color filter, a resolution, the number of pixels and a pixel width;

FIG. 33 is a diagram showing a conventional method for coloring a color filter.

DETAILED DESCRIPTION OF THE PREFERRED EMBODIMENTS

The preferred embodiment of the present invention will now be described in detail while referring to the accompanying drawings.

[Overview of a Color Filter Coloring Apparatus]

Figure 1:
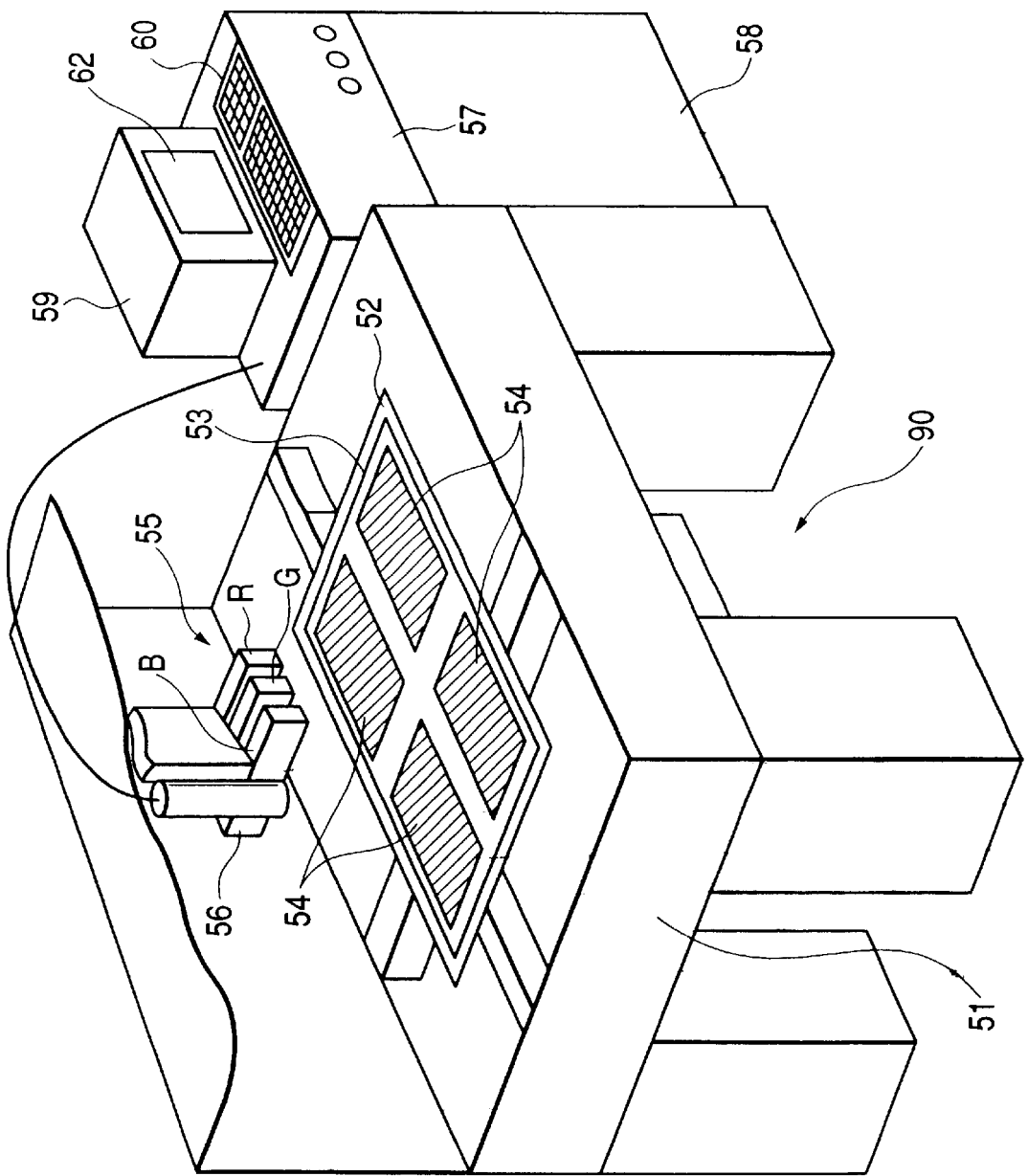
FIG. 1 is a schematic diagram showing the configuration of a color filter producing apparatus according to one embodiment of the present invention.

FIG. 1 is a schematic diagram showing the configuration of a color filter producing apparatus 90 according to the embodiment of the present invention. In FIG. 1, the color filter producing apparatus 90 comprises: a device table 51; an XYθ stage 52, on the table 51; a color filter substrate 53, which is positioned on the XYθ stage 52; color filters 54, formed on the color filter substrate 53; R (red), G (green) and B (blue) ink-jet heads 55, for drawing (coloring) the color filters 54; and a camera 56, on which a line sensor is mounted. With this arrangement, the landing positions of ink droplets ejected from the ink-jet heads 55 can be detected. Further, the presence/absence of non-ejection nozzles in each head can be detected by examining the pattern drawn by the ink droplets ejected onto the substrate 53, or the filter elements that are colored. An image processor apparatus 57 processes data obtained by the camera 56 and examines the presence/absence of non-ejection nozzles and the landing positions. A controller 58 exercises overall control of the operation of the color filter producing apparatus 90. A teaching pendent (personal computer) 59 controls the display unit and the input unit (operating unit) of the controller 58, and a keyboard 60 serves as the operating unit for the personal computer 59.

Figure 2:
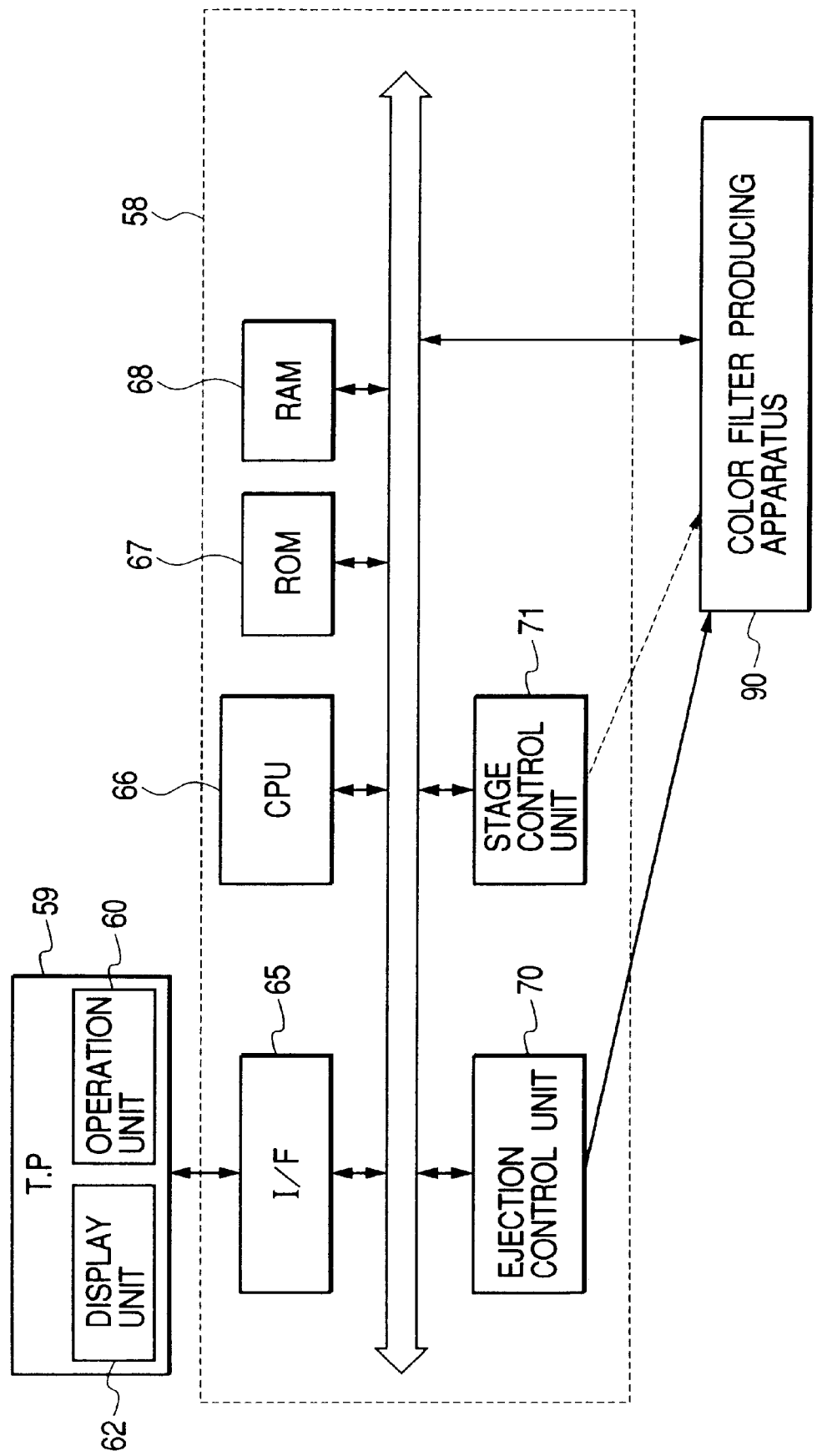
FIG. 2 is a diagram showing the configuration of a controller for controlling the operation of the color filter producing apparatus.

FIG. 2 is a diagram showing the configuration of the control unit of the color filter producing apparatus 90 of this embodiment. The personal computer 59 functions as the input/output means for the controller 58, and the display unit 62 displays the current state of the manufacturing process, as well as abnormality information, such the malfunctioning of the head. The operating unit 60 is used for the entry of operating instructions for the color filter producing apparatus 90.

The controller 58 controls the operation of the color filter producing apparatus 90. An interface 65 is used for the exchange of data by the personal computer 59 and the controller 58. The controller 58 comprises: a CPU 66, for controlling the color filter producing apparatus 90; a ROM 67, used to store a control program for operating the CPU 66; a RAM 68, used as a work area for the CPU 66 and used to store various data and information (the ejection drive voltage, the number of times of the scanning, the sub-scanning distance, etc.) related to the production condition; an ejection condition control unit 70, for controlling the ejection of ink onto the filter elements of the color filter; and a stage control unit 71, for controlling the movement of the XYθ stage 52 of the color filter producing apparatus 90. The color filter producing apparatus 90 is further connected to the controller 58 and is operated in accordance with instructions received from the controller.

[Explanation for Ink-Jet Heads]

Figure 3:
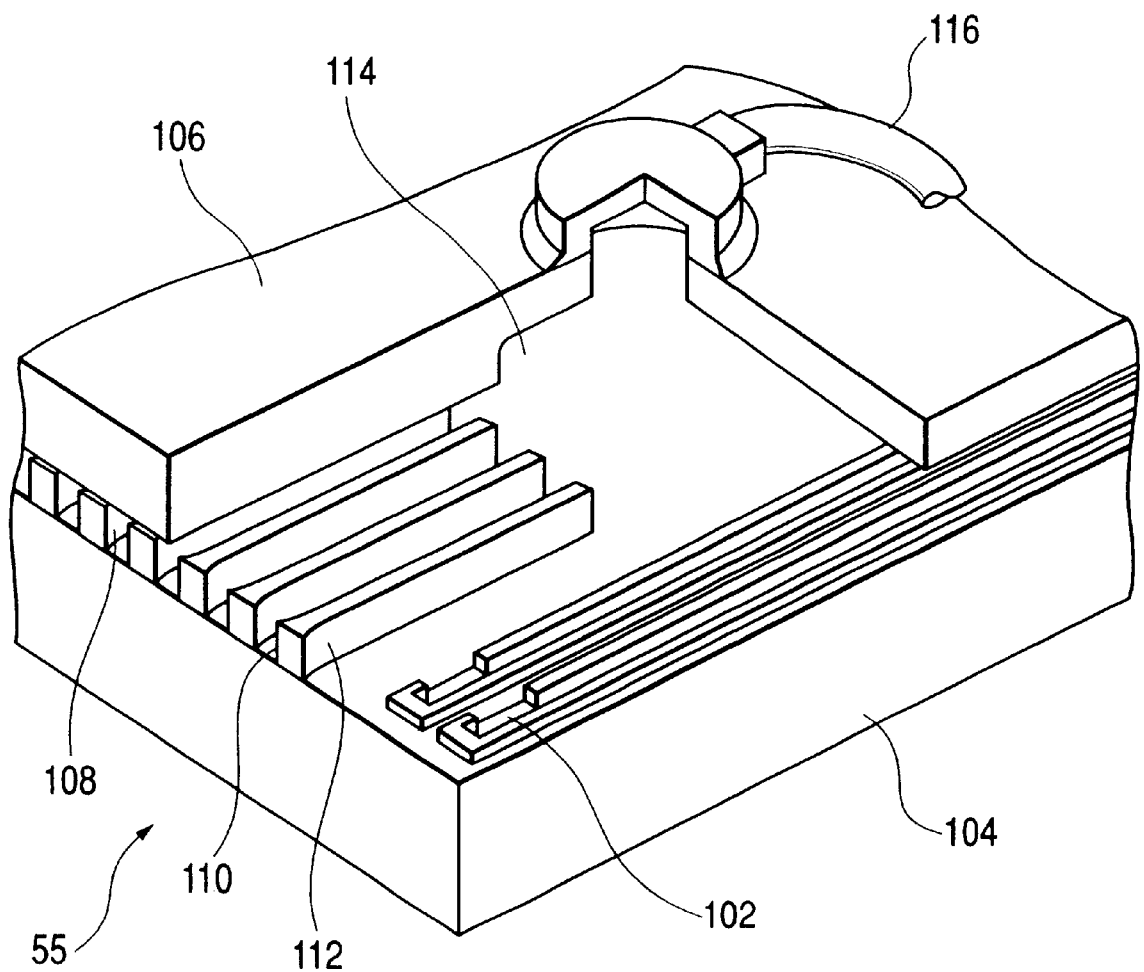
FIG. 3 is a diagram showing the structure of an ink-jet head used for the color filter producing apparatus.

FIG. 3 is a diagram showing the structure of an ink-jet head 55 used for the color filter producing apparatus 90. In FIG. 1, the three ink-jet heads 55 are respectively provided for the corresponding colors R, G and B; however, since these heads are structures alike, only one of them is shown in FIG. 3.

In FIG. 3, the ink-jet head 55 mainly includes a heater board 104 as a substrate on which multiple heaters 102, for heating ink are formed; and a top plate 106, which covers the heat board 104. Multiple discharge orifices 108 are formed in the top plate 106, and tunnel-shaped liquid paths 110, which communicate with the discharge orifices 108, are formed at the rear of the discharge orifices 108. The liquid paths 110 are separated by partition walls 112, and at the rear, are connected in common to a single ink chamber 114. Ink is supplied via an ink supply port 116 to the ink chamber 114, and from there, is transmitted along the liquid paths 110.

The heat board 104 and the top plate 106 are so aligned that the heaters 102 are located at positions corresponding to the liquid paths 110, and the structure shown in FIG. 3 is obtained. In FIG. 3, only two heaters 102 are shown; in actuality, however, the heater 102 is provided for each of the respective liquid paths 110. When a predetermined drive pulse is supplied to the heaters 102 in the assembly state shown in FIG. 3, ink on the heaters 102 boils and air bubbles are generated, and as the air bubbles expand, the ink is driven forward and ejected from the discharge orifices 108. Therefore, the size of an air bubble can be adjusted by controlling the drive pulse applied to the heater 102, and the volume of ink ejected from the discharge orifice 108 can be arbitrarily controlled.

[Method for Controlling the Quantity of Ejected Ink]

Figure 4:
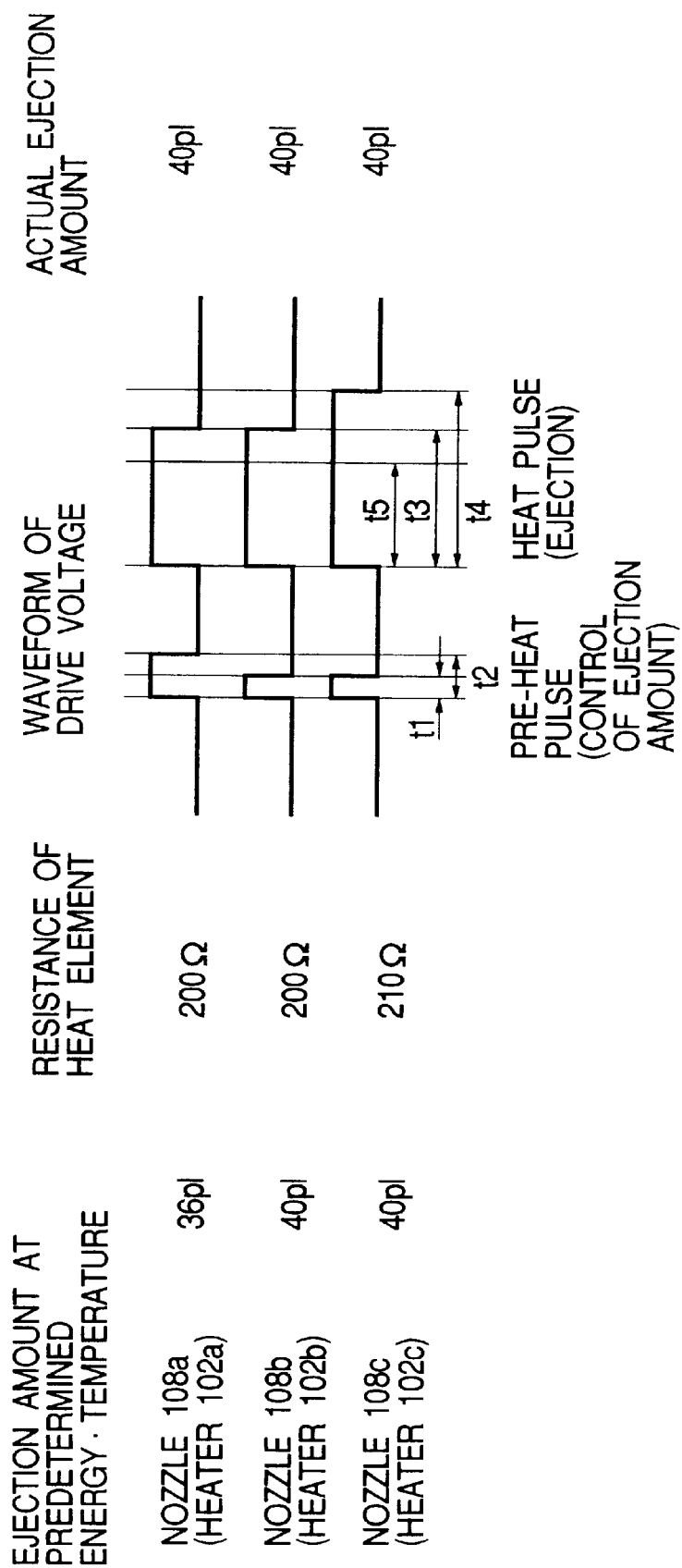
FIG. 4 is a diagram showing the waveform of a voltage applied to the heater of the ink-jet head.

FIG. 4 is a diagram for explaining the method for changing the power supplied to a heater to control the volume of ejected ink.

In this embodiment, in order to adjust the amount of ejected ink, two constant voltage pulses are applied to the heaters 102. These two pulses are a pre-heat pulse and a main heat pulse (hereafter referred to simply as a heat pulse), as shown in FIG. 4. The preheat pulse is a pulse employed to heat ink to a predetermined temperature before the ink is actually ejected, and is set to a value smaller than a minimum pulse width t5 required for ink ejection. Therefore, no ink is ejected by a pre-heat pulse. The pre-heat pulse is applied to the heaters 102 because, when the initial temperature of ink is raised to a predetermined temperature, a constant quantity of ink is ejected upon the application of a constant heat pulse. Whereas, when the length of the pre-heat pulse is adjusted, the amount of ejected ink can differ even when the temperature of the ink is adjusted in advance and the same heat pulse is applied. Further, when ink is heated before the heat pulse is applied, upon the application of the heat pulse the leading edge of the ejected ink reacts early and provides a superior response.

The heat pulse is a pulse for the actual ejection of ink, and is set to a value greater than the minimum pulse width t5 required for ink ejection. Since the energy generated by the heaters 102 is proportional to the width of the heat pulse (application time), the difference in the characteristics of the heaters 102 can be adjusted by controlling the width of the heat pulse.

It should be noted that the quantity of ejected ink can also be controlled by adjusting the interval between the pre-heat pulse and the heat pulse, and by controlling the heat dispersion state that occurs due to the application of the pre-heat pulse.

As is apparent from the above explanation, the quantity of ejected ink can be controlled by either adjusting the application times for the pre-heat pulse and the heat pulse, or by adjusting the application interval between the pre-heat pulse and the heat pulse. Therefore, since the application times for the pre-heat pulse and the heat pulse, or the application interval between the pre-heat pulse and the heat pulse can be adjusted as needed, the quantity of ejected ink and the response to the application pulse for the ejection of ink can be arbitrarily controlled. Especially for the coloring of a color filter, it is preferable that among the filter elements, or in individual elements, the coloration density (color density) be substantially uniform in order to prevent the occurrence of uneven colors. Thus, the same quantity of ink may be ejected from the individual nozzles. When the same amount of ink is ejected from each nozzle, the same amount of ink lands in each filter element, and thus the color densities of the filter elements can be substantially equal. Also, the uneven coloring that occurs in individual filter elements can be reduced. Therefore, to ensure the same quantity of ink is ejected from each nozzle, only the above described ink ejection control procedures need be applied.

[Color Filter Producing Process: (1) Acceptor Layer Type]

FIGS. 5A to 5F are diagrams for explaining an example of a color filter producing method according to the embodiment. In this embodiment, a glass substrate is employed as a substrate 1; however, any substrate, such as a plastic substrate, may be employed so long as it possesses the characteristics required of a liquid crystal color filter, including transparency and adequate mechanical strength.

Figure 5A:
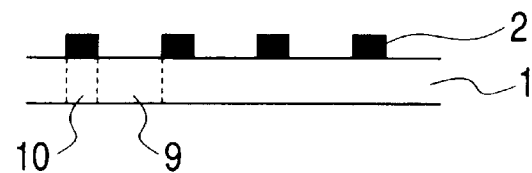
FIGS. 5A, 5B, 5C, 5D, 5E and 5F are diagrams showing an example color filter production method.
Figure 5B:

Although in the diagram in FIG. 5A a glass substrate 1 is shown that includes a light transmitting portion 9 and a black matrix (BM) 2, which serves to define a light shielded portion 10, it should be noted that the black matrix 2 is not always required. The substrate 1, on which the black matrix 2 is formed, is coated with a resin composition (or compound) 3 that initially has poor acceptability of ink, but that under specific conditions (e.g., when irradiated with light, or when irradiated with light and heated) acquires an affinity for ink and that under specific conditions acquires a setting (or hardening) characteristic. Then, a resin composition layer 3 is formed by prebaking, as needed (FIG. 5B). No limitations are placed on the methods that can be used to form the resin composition layer 3; any coating method, to include spin coating, roll coating, bar coating, spray coating or dip coating, can be employed.

Figure 5C:
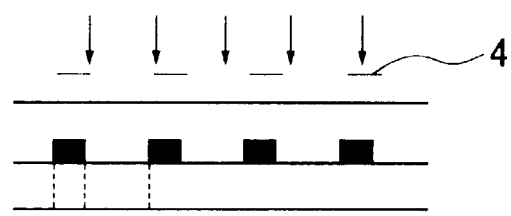
Figure 5D:
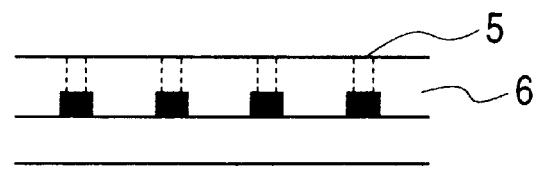
Figure 5E:
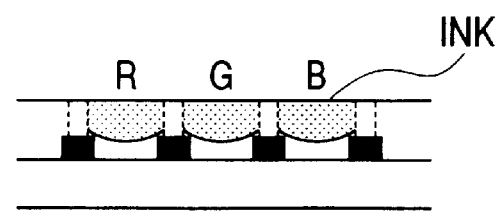

Following this, when a photo mask 4 is used for performing the pattern-exposure of the resin layer on the light transmitting portions 9, an affinity for ink is acquired by the non-masked portions of the resin layer (FIG. 5C). Portions 6 (the exposed portions), which exhibit the affinity for ink, and portions 5 (the non-masked portions), which exhibit no affinity for ink, are formed on the resin composition layer 3 (FIG. 5D).

Thereafter, inks in the colors R (red), G (green) and B (blue) are ejected from the ink-jet head 55 onto the resin composition layer 3 to color the layer 3 (FIG. 5E), and as needed, are dried. The portions that is colored with the colors R, G and B are called filter elements and function as color filters. The ink-jet method that is used can be one that employs thermal energy or one that uses mechanical energy; either method can be appropriately employed. Further, any ink that is appropriate for use with an ink-jet head can be employed. And of the various dyes or pigments that are available, any appropriate material can be selected and used as an ink coloration material that matches the required light transmission spectra for the R, G and B pixels.

Figure 5F:
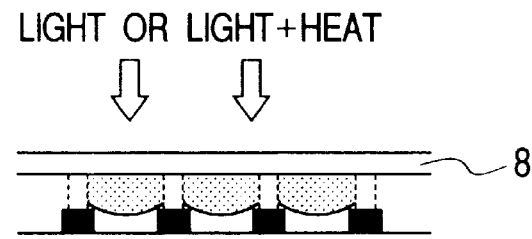

Then, light irradiation, or light irradiation and heating are performed to set (or harden) the colored resin composition material 3, and a protective layer 8 is formed on the surface, as needed (FIG. 5F). In addition, the resin composition layer 3 can also be set under a condition that differs from the condition provided for the ink affinity processing (FIG. 5C), e.g., a condition wherein the exposure amount for light irradiation is increased, or wherein the heating condition differs, or a condition wherein both light irradiation and heating are employed.

Another color filter producing method, which differs from the above method but which can also be used for the embodiment, will now be described while referring to FIGS. 6A to 6F. The same reference numerals as are used in FIGS. 5A to 5F are used to denote corresponding members in FIGS. 6A to 6F.

Figure 6A:
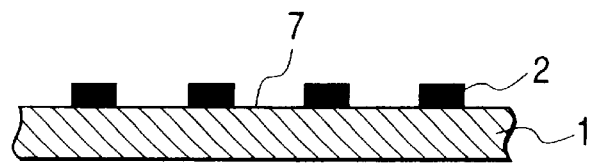
FIGS. 6A, 6B, 6C, 6D, 6E and 6F are diagrams showing another example color filter production method.
Figure 6B:
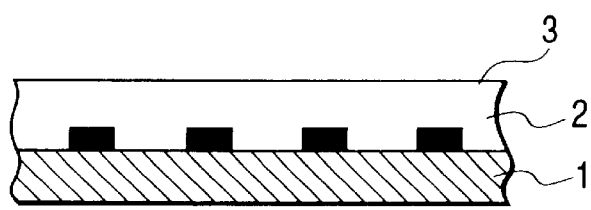

In FIG. 6A, the glass substrate 1 comprises the light transmitting portion 9 and the black matrixes 2, which are light-shielding portions. First, the substrate 1 on which the black matrixes 2 are formed is coated with a resin composition that has an affinity for ink and can be hardened when irradiated with light or when irradiated with light and heated, and the resultant structure is pre-baked as needed to form the resin layer 3 (FIG. 6B). No limitations are imposed on the methods that can be used to form the resin for the resin layer 3; any coating method, to include spin coating, roll coating, bar coating, spray coating or dip coating, can be employed.

Figure 6C:
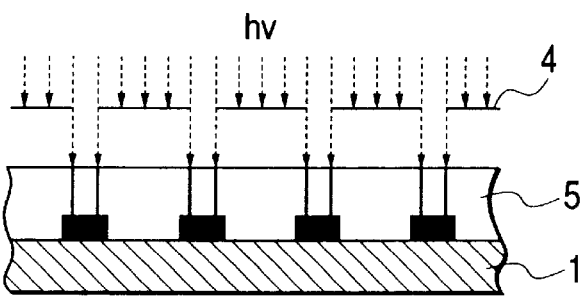
Figure 6D:
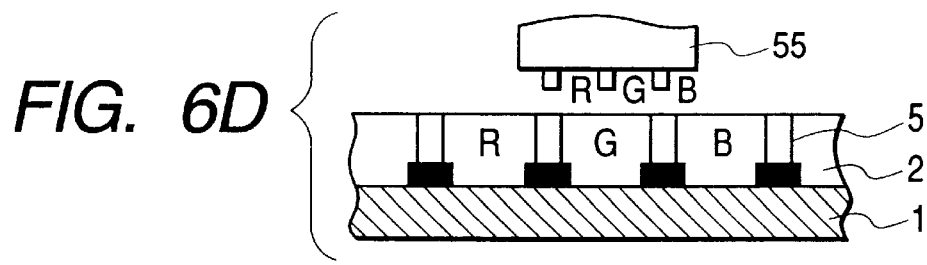
Figure 6E:
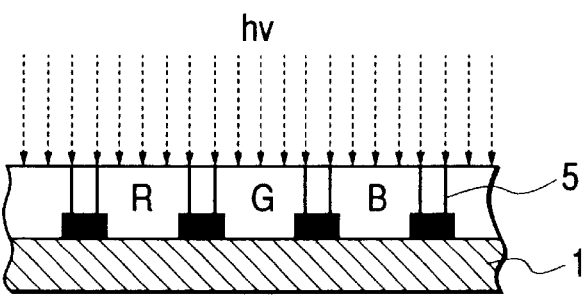

Then, using the photomask 4, the pattern-exposure is performed in advance for the portions of the resin layer 3 that are covered by the black matrixes 2, so that the resin layer 3 is partially hardened and forms the portions 5 wherein ink is not absorbed (non-colored portions) (FIG. 6C). Thereafter, the ink-jet head 55 is employed to simultaneously eject ink in the colors R, G and B (FIG. 6D), and the ink is dried as needed.

In the photomask 4 used for the pattern-exposure, openings are provided for hardening the portions that are covered with the black matrixes 2. And when ink is deposited, a larger amount of ink must be provided at portions contacting the black matrixes 2 so as to prevent the occurrence of missing color of a coloring agent on the portions. Therefore, it is preferable that the photomask 4 be used in which the openings are smaller than the (light-shielding) width of the black matrixes 2. A dye ink or a pigment ink can be used for coloring, and both liquid ink and solid ink can be employed.

Any resin composition can be used for this embodiment, just so long as the resin composition possesses an affinity for ink and it can, at the least, be hardened either by light irradiation or by light irradiation and heat. Example resins that can be used are an acrylic resin, an epoxy resin, a silicon resin, a cellulosic (or cellulose derivative), such as a hydroxy propyl cellulose, hydroxy ethyl cellulose, methyl cellulose and carboxy methyl cellulose, and denatured materials derived from them.

A photo-initiation agent (a cross-linking agent) may be employed to accelerate the bridging reaction induced in the resin by light or by light and heat. As the photo-initiation agent, there can be employed a bichromate, a bis-azide compound, a radical initiation agent, a cation initiation agent, an anion initiation agent or the like. Further, these photo-initiation agents may be mixed together, or may be used in tandem with another sensitizer. In addition, an optical acid generator, such as onium salt, may also be used as a cross-linking agent. It should be noted that the heating process may be performed after light irradiation has been completed in order to accelerate the cross-linking reaction.

A resin layer containing these compositions is very resistant to heat and water, and can satisfactorily withstand the high temperatures accompanying the following process, or a cleaning process.

The ink-jet method employed for this embodiment can be a bubble-jet type that uses as an electro-thermal conversion element an energy generation element, or a piezo-jet type that uses a piezoelectric element. An area to be colored and a pattern to be colored can be set arbitrarily.

Further, in this embodiment, the black matrixes 2 are formed on the substrate. However, the black matrixes may be formed after the resin composition layer that can be hardened has been formed, or may be formed on a resin layer after the coloration process has been performed, i.e., the formation of the black matrixes 2 is not limited to the embodiment. Further, as the formation method, it is preferable that a thin metal film be formed on the substrate 1 by sputtering or evaporation, and the resultant structure be patterned using photolithography. However, no limitations are imposed on the methods that can be used.

Figure 6F:
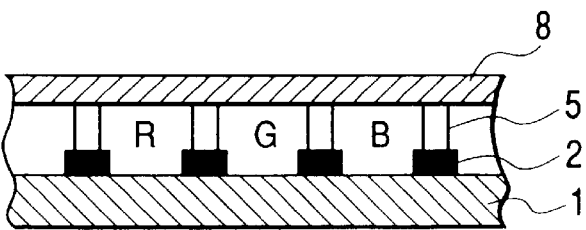

Following this, either light irradiation or heating, or both light irradiation and heating are performed to harden the resin composition (FIG. 6E), and as needed, the protective layer 8 is formed (FIG. 6F). It should be noted that hv indicates the intensity of light, and that during the heating process, instead of light of hv heat is applied. Further, the protective layer 8 can be formed of a second resin composition of a photosetting type, a thermosetting type, or both a photosetting and thermosetting type, or can be formed of a non-organic material by evaporation or sputtering. So long as the protective layer 8 is transparent as a color filter and can be sufficiently resistant to the succeeding ITO formation process and orientation film formation process, any type can be employed.

In the examples in FIGS. 5A to 5F and FIGS. 6A to 6F, the resin composition layer 3 has been formed on the glass substrate to accept ink. However, the present invention is not limited to this, and ink can be is applied directly to the glass substrate 1 to form filter elements. This example will be explained while referring to FIGS. 7A to 7D.

[Color Filter Producing Process: (2) No Acceptor Layer Type]

FIGS. 7A to 7D are diagrams showing a color filter manufacturing method that differs from the one previously discussed but it can also be used for this embodiment. The same reference numerals as used in FIGS. 5A to 5F are also used to denote corresponding components in FIGS. 7A to 7D.

Figure 7A:
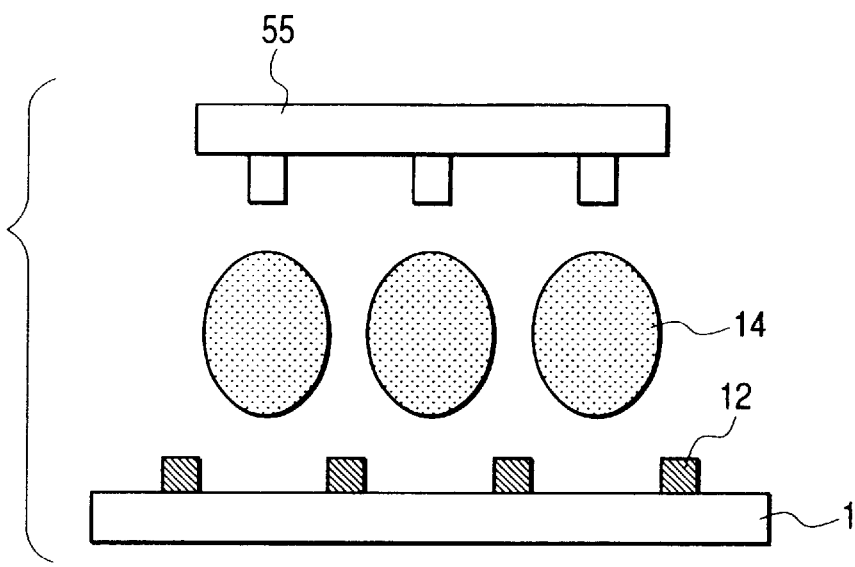
FIGS. 7A, 7B, 7C and 7D are diagrams showing still another example color filter production method.
Figure 7B:
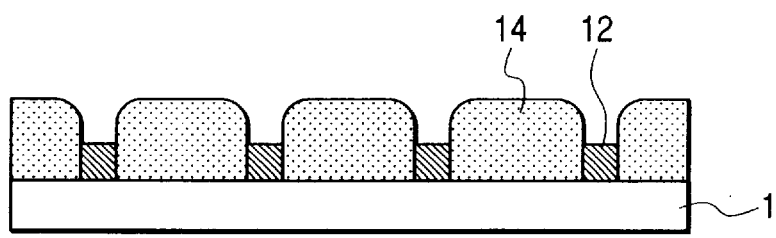

In FIG. 7A, ink-repellent partition walls 12 are formed on the light-transmitting substrate 1, and hardening ink 14 is applied using an ink-jet head 55. In this invention, the partition walls 12 are members that form recessed portions for receiving the hardening ink 14, and that prevent mixture of inks of different colors in adjacent color filters. The partition wall 12 can be easily formed by patterning performed using a photosensitive resist, for example. But whereas black matrixes or black stripes can also serve as the partition walls 12, only a black resist need be patterned in that case.

In this invention, the partition walls 12 may be directly formed on the light-transmitting substrate 1, or they may be formed, as needed, on a substrate on which a layer having another function is formed, e.g., on an active matrix substrate on which a TFT array is fabricated. In either case, to improve the dispersion of hardening ink, a specific surface process may be executed for a surface whereon a color filter has been formed.

The hardening ink 14 used for this invention is hardened when irradiated with light or when heated, or when irradiated with light and heated. The hardening ink 14 can be either a liquid or a solid ink, and can be either a pigment or a dying ink. The hardening ink 14 contains a resin element, which is hardened when irradiated with light or heated or when both irradiated with light and heated, a coloring element, an organic solvent and water.

A resin or hardening agent that is available on the market, specifically, an acrylic resin, an epoxy resin or a melamine resin, can be used as the hardening element.

Figure 7C:
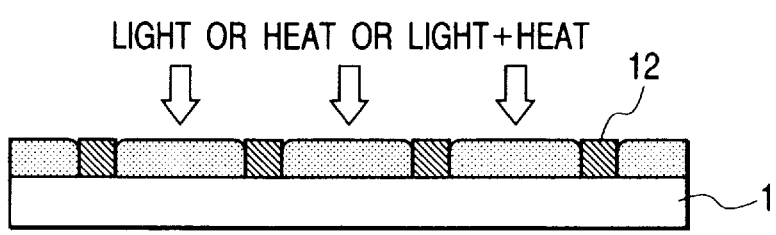
Figure 7D:
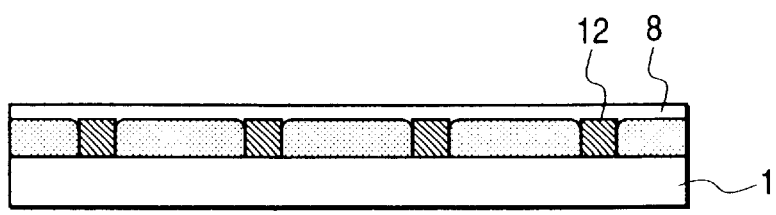

After the hardening ink 14 is applied to the filter elements (FIG. 7B), the drying process is performed as needed, and light irradiation or heating or both light irradiation and heating are used to harden the ink and to form the color filter (FIG. 7C). Thereafter, the protective layer 8 is formed as needed (FIG. 7D).

[Overview of Color Filter Coloration Method]

Figure 8A:
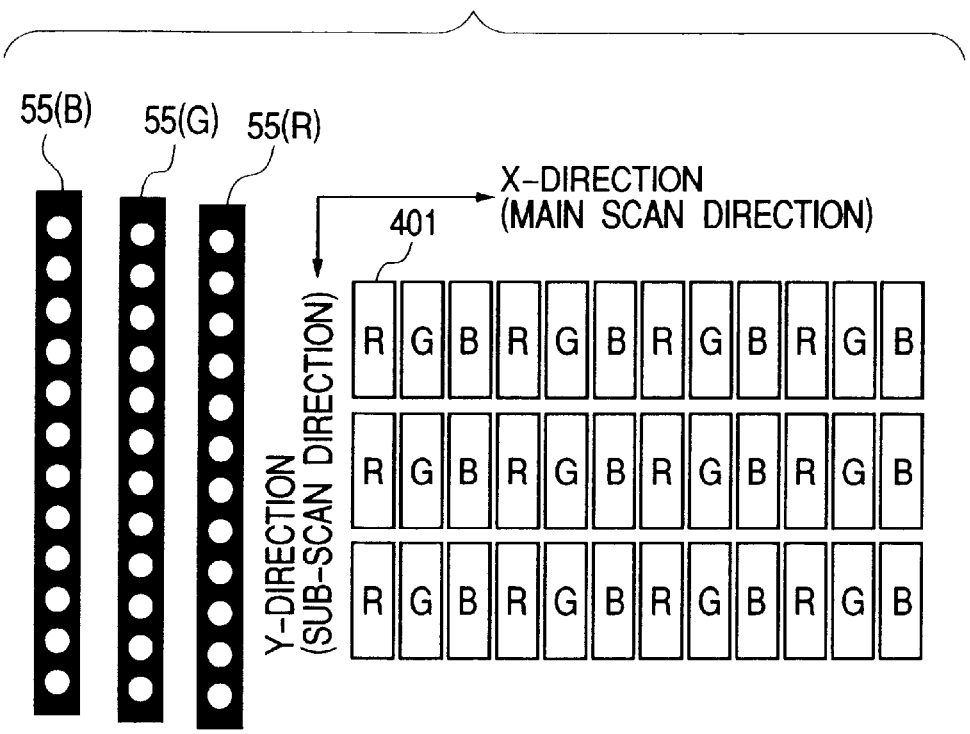
FIGS. 8A and 8B are diagrams showing the relationship between ink-jet heads and filter elements formed on a substrate.
Figure 8B:
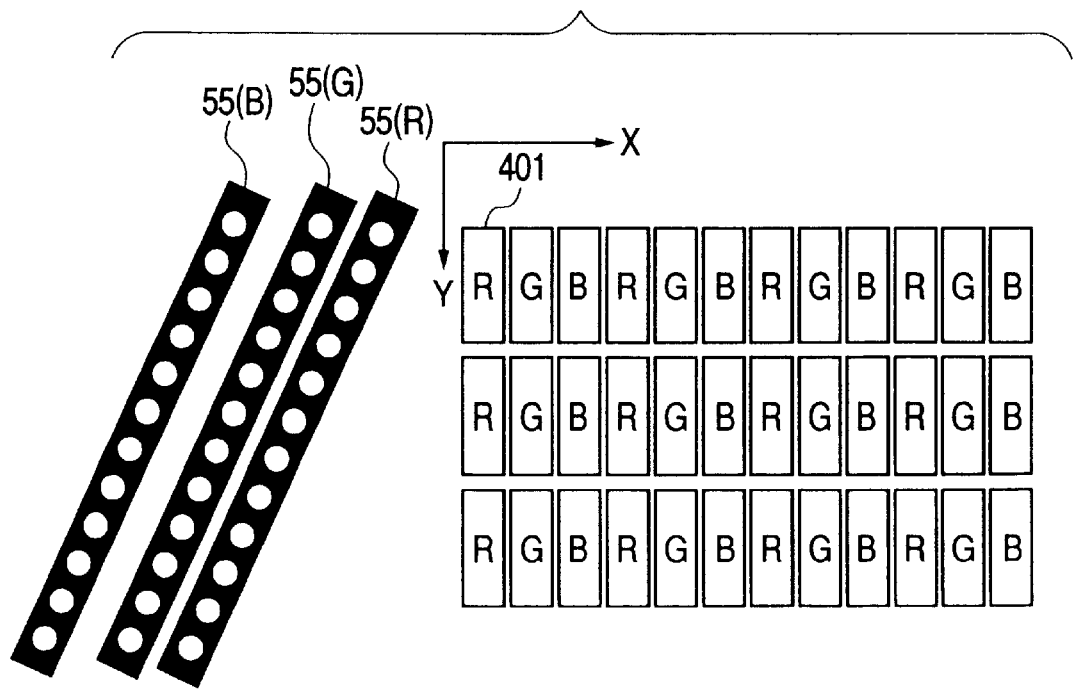

The method used to color the filter elements will now be described while referring to FIGS. 8A and 8B. FIGS. 8A and 8B are diagrams showing the relationship between the ink-jet heads 55 and filter elements 401 formed on a substrate (glass substrate) 53 according to the embodiment. In FIG. 8A, the ink-jet heads 55 are arranged substantially parallel to direction Y of the filter elements 401, while in FIG. 8B, the ink-jet heads 55 are positioned so that they are inclined towards direction Y of the filter elements 401. In this embodiment, when the stage control unit 71 inclines the XYθ stage 52, the ink-jet heads 55 are inclined at a predetermined angle relative to direction Y of the filter elements 401 as is shown in FIG. 8B. However, the ink-jet heads 55 may themselves be inclined. Further, in this embodiment, since the filter elements are formed by multiple ejections of ink, the distance (nozzle pitch) between the nozzles of the ink-jet heads 55 is smaller than the distance between the filter elements in direction Y.

Figure 9:
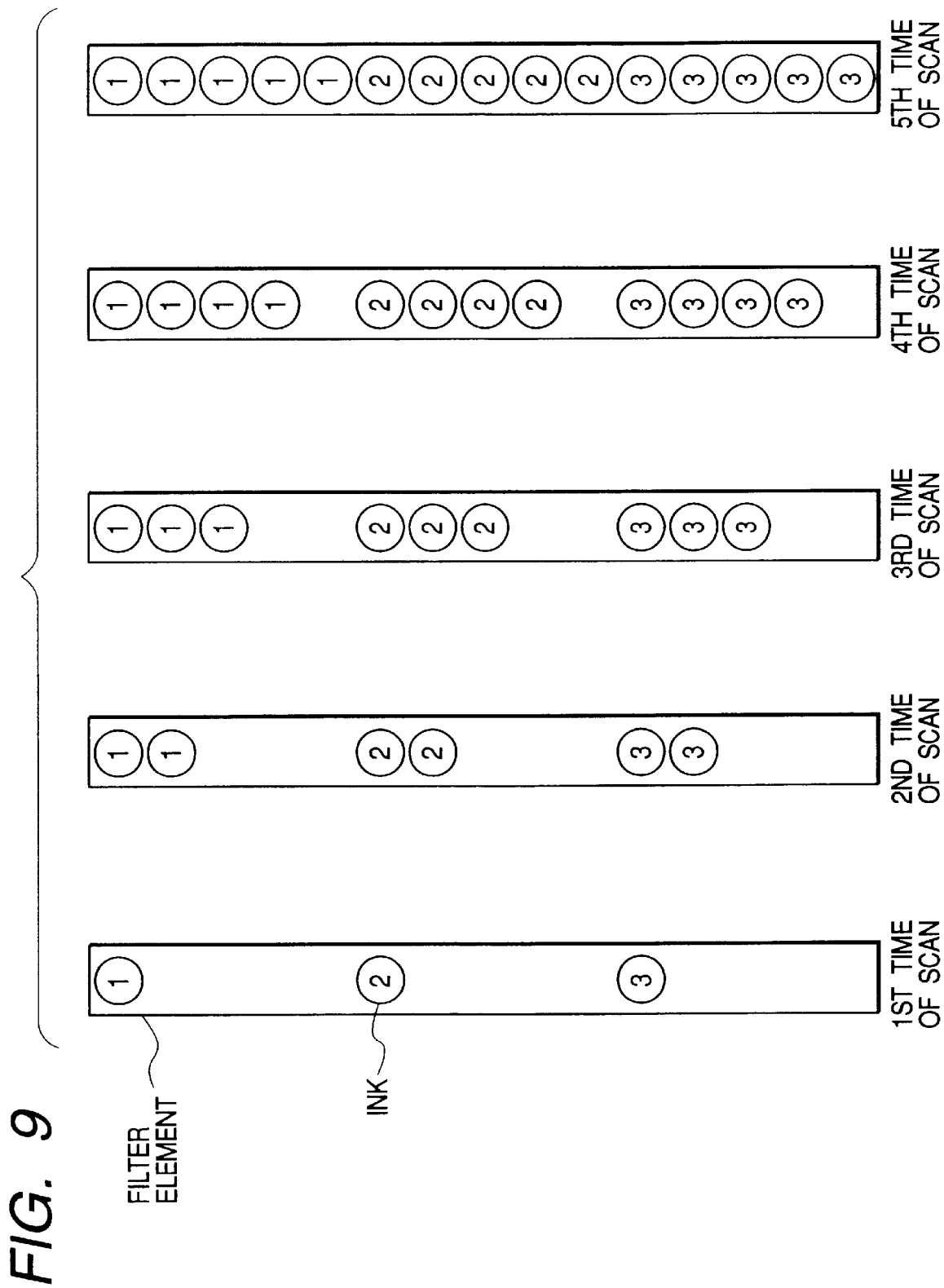
FIG. 9 is a diagram showing a filter element formed of 15 ink droplets ejected during five relative scans.

In this embodiment, the nozzles and the substrate are shifted relative to direction X in FIGS. 8A and 8B, and ink is ejected from the nozzles as they are being shifted, so that the color filter of the color pattern shown in FIGS. 8A and 8B is formed. That is, ink is ejected so that the filter elements in direction Y (substantially the same direction as the nozzle arrangement direction) have the same color, and so that adjacent filter elements in direction X (the relative movement direction) have different colors, i.e., the colors RGB are sequentially repeated along the X direction. The filter elements are formed of multiple ejected ink droplets, and in this case, it is preferable that ink be ejected from multiple different nozzles to form the filter elements. Further, it is preferable that the heads and the substrate are relatively scanned multiple times, and that the filter elements be formed of ink ejected during multiple relative scans, i.e., that the multi-path method be used to color the filter elements. For example, to form a filter element using 15 ink droplets ejected during five successive relative scans, as is shown in FIG. 9, three ink droplets (ink (1), ink (2) and ink (3)) are landed (or deposited) during the first scan, and three ink droplets (ink (1), ink (2) and ink (3)) are landed at different locations during the second scan. And similarly, during the third, fourth and fifth scams, three ink droplets are landed each time to form one filter element. In FIG. 9, ink (1) to ink (3) are ejected from nozzles corresponding to these numbers.

It should be noted that the process used to color a color filter is performed by the execution of a coloring control program stored in the ROM 67 in FIG. 2. This program is executed under the control of the CPU 66.

[Color Filter Producing Process]

Figure 10:
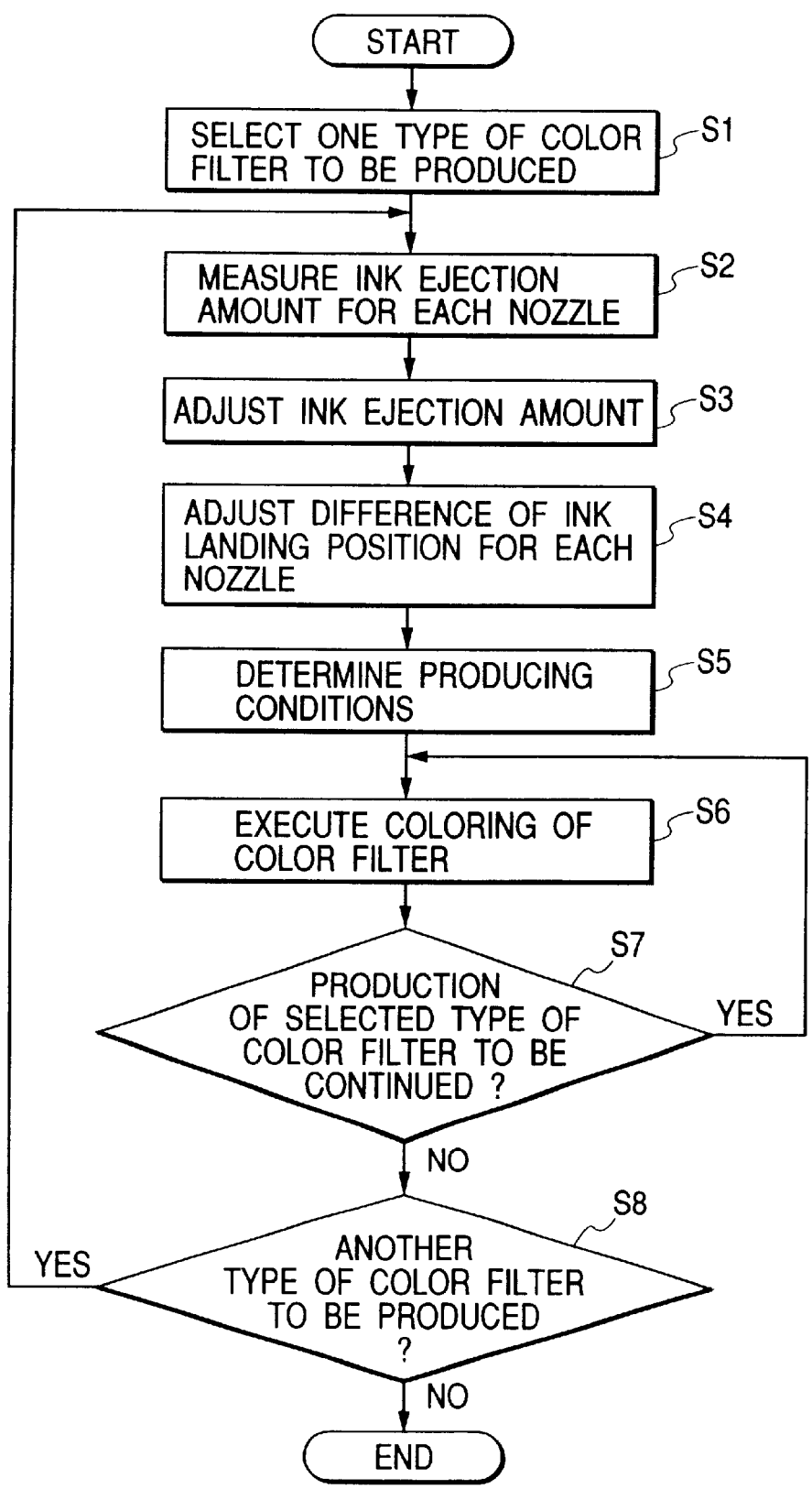
FIG. 10 is a flowchart for the processing for the manufacture of a color filter.

FIG. 10 is a flowchart showing the processing used to produce a color filter. This processing will now be described while referring to the flowchart.

First, at step S1, one of multiple types of color filters to be produced is selected. The color filter types are 10 VGA, 12.1 SVGA, 14.1 XGA and others, and differ in the sizes and the number of filter elements or in the sizes of substrates. When the size and the number of filter elements, or the size of the substrate differs, the total amount of ink applied to the filter elements, the amount of ink ejected each time from the nozzles, the number of times of scans of the substrate, and the heads must be changed. For example, when the size of the filter element is reduced, it is preferable that the amount of ink ejected each time from a nozzle be reduced. In this manner, color filter producing conditions must be set in accordance with the type of color filter that is to be produced, and therefore, at step S1, the color filter type is selected. It should be noted that the keyboard is used to select the color filter type, and that data indicating the selected color filter type be transmitted to a CPU 22 in FIG. 2.

At step S2, the quantity of the ink ejected from each nozzle is measured. Specifically, an ink ejection amount measurement pattern (FIG. 11) is drawn and read in order to measure the quantity of the ink ejected from each ink ejection nozzle. By employing the results obtained from this reading, the amount of ink ejected from each nozzle can be determined.

At step S3, based on the measurement results acquired at the step S2, the quantity of ink ejected from each nozzle is adjusted so that the quantity ejected from all nozzles is substantially the same. As is described above, the quantity of ink may be adjusted by controlling the application times for the pre-heat and the heat pulses, by adjusting the application interval between the pre-heat and the heat pulses, or by adjusting the pulse voltages that are applied. It should be noted, however, that the available ink volume adjustment methods are not limited to the ones that are herewith enumerated.

At step S4, the displacements of the landing locations of the ink ejected from each nozzle are adjusted. During this process, the adjustment is executed so that the ink ejected from each nozzle may land to a target location. Specifically, in order to remove the difference between landing locations of the ejected inks, a sensor detects (measures) the landing location of each ejected ink, and based on the obtained results, the ejection timing is changed. Thus, the ejected inks can land along the center line of a filter element.

At step S5, the production condition is determined in accordance with the color filter type selected at step S1. Specifically, information indicating a color filter type is transmitted to the CPU 66, and based on the information, the CPU 66 reads production conditions stored in the RAM 68, and determines which of the production conditions to use. A production condition table includes: the total amount of ink applied to each filter element, the amount of ink ejected each time from each nozzle, the number of times of scans, the amount of sub-scanning and the range of the currently used nozzle in the head, i.e., necessary data concerning the production condition required to produce a color filter. It should be noted that data, equivalent in number to the color filter types, are stored in the table, and that each time the color filter type is changed, corresponding data are read. To acquire the data concerning the production conditions, optimal data are obtained in advance through experimentation.

At step S6, color filters are colored at the ejection timing determined at the step S4 and under the production conditions determined at the step S5. Then, at step S7, a check is performed to determine whether the production of the color filters of the type selected at the step S1 should be continued. This determination is performed by comparing the number of the color filters produced with a number that was designated in advance. When the production of the selected type of color filter is to be continued, i.e., the number is less than the previously designated number, program control returns to the step S6, and the coloration of color filter continues under the production condition. When the production of the selected type of color filter should be halted, program control advances to step S8. At the step S8, a check is performed to determine whether the color filter type to be produced should be changed. When it is ascertained that the color filter type to be produced should be changed, that is, when a color filter of a different type is to be produced, the producing condition must be changed, and program control returns to the step S1. When a different color filter type is not to be produced, the color filter producing process is terminated.

In the flowchart in FIG. 10, the process for measuring the amount of ink ejected from each nozzle (the step S2) and the process for adjusting the amount of ejected ink (the step S3) are performed; however, these processes need not always be performed. For example, for a high-performance ink-jet head for which there is substantially no variance in the quantities of ink ejected from the nozzles, the amount of ejected ink need not be adjusted, and the processes at the steps S1 and S2 are not required. However, as the ink-jet head continues to be employed, the amount of ejected ink may change as time elapses. Thus, it is preferable that the processes at the steps S2 and S3 be performed each time the color filter type is changed. The same thing is applied for the step S4. In addition, in the above explanation, the processes at the steps S2, S3 and S4 are performed by the same apparatus; however, these processes may be performed by an apparatus separate from the color filter producing apparatus. In this case, it is preferable that these processes be performed before the color filter producing apparatus colors a color filter.

The processing in the flowchart in FIG. 10 will now be described in more detail. It should be noted that the control program for the processing in FIG. 10 is stored in the ROM 67 in FIG. 2, and is executed under the control of the CPU 66.

[Measurement and Adjustment of the Amount of Ink Ejected from each Nozzle]

First, the processes at the steps S2 and S3 will be described in detail. At the step S2, the ink ejection amount measurement pattern is drawn, and is read to determine the amount of ink ejected from a nozzle.

Figure 11:
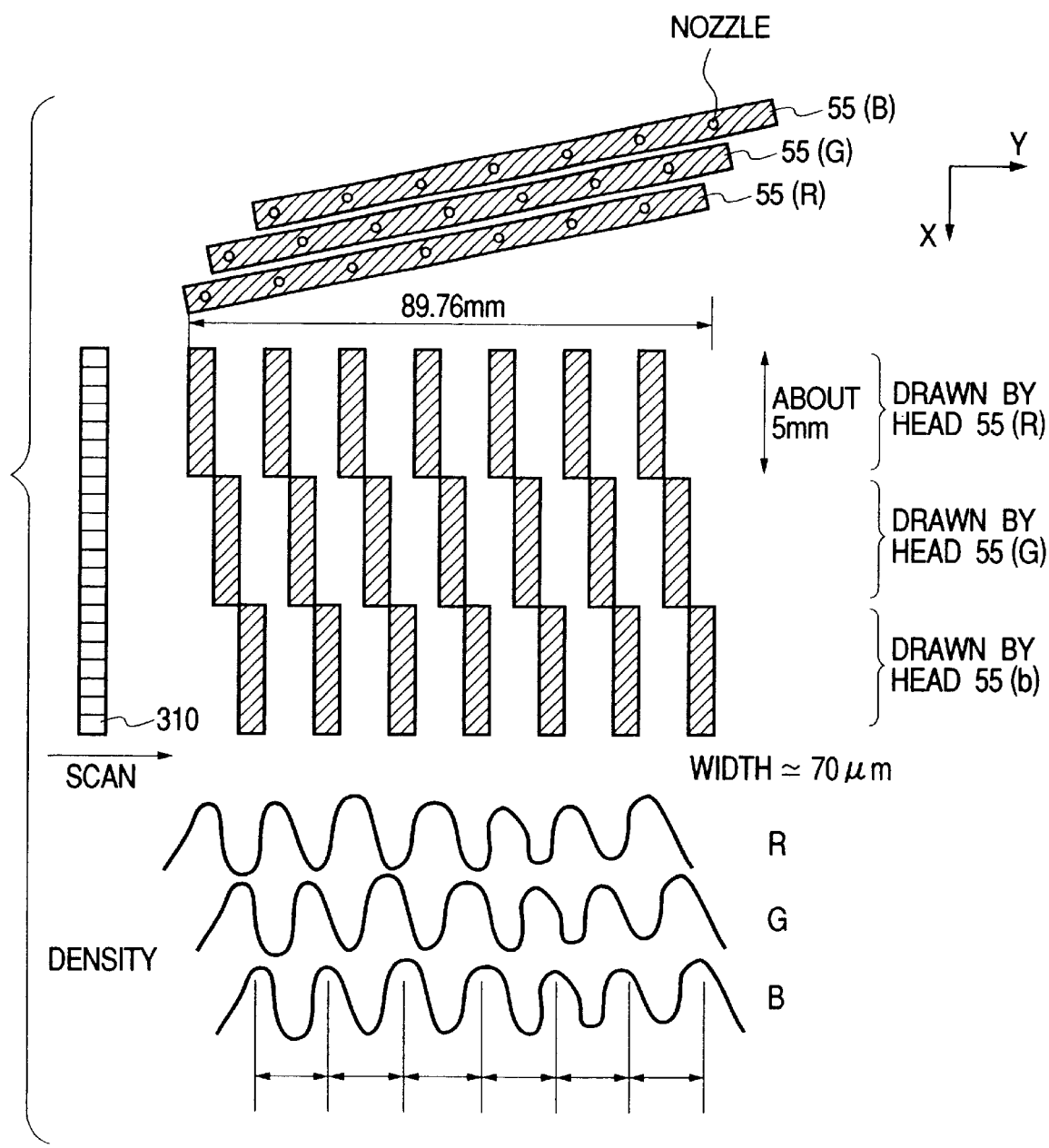
FIG. 11 is a diagram showing an ejected ink quantity measurement pattern for detecting the quantity of ink ejected from each nozzle of the head.

Specifically, at the step S2 in FIG. 10, inks are ejected from the nozzles of the heads 55 while relatively scanning the ink-jet heads 55, regarding the glass substrate, in direction X, so as to draw the approximately 5 mm-length line patterns shown in FIG. 11. These are the above described ink ejection amount measurement patterns. At this time, pre-heat pulses having the same pattern and heat pulses having the same pattern are applied to the heaters for the nozzles.

Then, a line sensor camera 310 is relatively scanned, regarding the glass substrate, in direction Y and measures the density of each line patterns drawn accordingly, and the amount of ink ejected from each nozzle is determined based on the density of the line pattern. Thus, the data for the ink ejected from each nozzle is obtained.

An explanation will now be given for a specific method for obtaining the amount of ejected ink based on the density of the line pattern (ink ejection amount measurement pattern).

First, the line sensor camera 310 measures the density of the line pattern as shown in FIG. 11. In this embodiment, since a line pattern has a with of about 70 $\mu$m, the accumulated value of the densities within a range of ±40 $\mu$m, measured from the center of gravity location for the line pattern, is obtained in direction Y.

Then, the amount of ink for one time of ejection from an arbitrary nozzle of an ink-jet head under an arbitrary condition is measured to obtain a reference calibration curve. The amount of ink for one time of ejection is normally the amount of ejection of one ink droplet. However, since the ink is not always ejected as a droplet, the amount of ink for one time of ejection is employed without using the amount of ejection of one ink droplet.

As the first process, of the multiple nozzles of the ink-jet head for which the ejection amount is to be measured, at least two nozzles that differ in the amount of ink ejected one time under a specific condition are selected, and the amount of ink ejected is determined using the gravimetric method or the absorbance method. In this embodiment, the gravimetric method is employed to obtain in advance the amount of ink for one time of ejection from each of four nozzles for which the ink ejection amounts differ under a specific condition.

Then, under the same conditions used for the measurement of the ink ejection amounts, ink is again ejected from each of these four nozzles whose the amount of ink for one time of ejection has been determined, and the density of the ink dots formed on the glass substrate by thus ejected inks is measured. By means of this measurement, the amounts of ink ejected from the four nozzles and the densities of the ink dots that are formed are obtained with a one-to-one correspondence. It should be noted that the density data for the ink dots formed by the four nozzles are obtained by sampling 50 dots and calculating the average value. The standard deviation of the density data is 5% relative to the average value.

FIG. 12 is a graph showing the relationship between the amount of ink for one time of ejection and the density of ink dots formed on the glass substrate. In FIG. 12, black dots correspond to points indicating the ink ejection amounts of four nozzles and the ink dot densities thereof. As is apparent from this graph, the four points are positioned substantially linearly. Therefore, when a linear line is run along the four points, the density of the ink dot is uniquely obtained as a point along the linear line for an arbitrary ink ejection amount. This linear line is called a calibration line.

Since the calibration line is represented as a linear line, at least two points can be plotted on the graph to obtain it. Therefore, instead of four different nozzles, at least two nozzles may be employed to obtain the calibration line. However, in this embodiment, since the data for the ink ejection amount that is obtained using the gravimetric method or the absorbance method is used in order to acquire the calibration line, the accuracy of the measurement method directly affects the precision of the ejection amount measurement. Therefore, it is preferable that at least three nozzles be used to obtain the calibration line. Further, the calibration line should be obtained each time the ink type is changed.

Then, the density of the line pattern previously obtained and the calibration line are employed to obtain the amount of ink for one time of ejection from one nozzle that corresponds to the density of the line pattern. Unlike for the line pattern, the amount of ejected ink obtained using this process is the amount of ink for one time of ejection from a nozzle, and is not the amount of ink ejected from multiple nozzles just as the like pattern. However, the present inventor found through experimentation that even when the density of the line pattern was employed in order to obtain the amount of ink for one time of ejection, the precision of the measurement of the amount ejected was not substantially affected.

In the above described manner, the amount of ink for one time of ejection is obtained for nozzles of the ink-jet heads 55(R), 55(G) and 55(B).

Based on the thus obtained ink ejection amount for each nozzle, at the step S3 in FIG. 10, the application interval and the application time of the pulse are changed to substantially equal the amount of ink ejected from the individual nozzles. The methods used for measuring the ink ejection amount and for adjusting the ink ejection amount are not limited to the ones that have herein been explained, and so long as heads having equal ink ejection amounts are employed from the beginning, the processes at the steps S2 and S3 need not always be performed. However, since errors in the quantities ejected by such heads may exceed the permissible range, preferably, the processes at steps S2 and S3 are performed.

[Adjustment (Correction) of the Landing Location of Ink Ejected from each Nozzle]

The process at the step S4 in FIG. 10 will now be described in detail. At the step S4, ink is ejected from each nozzle, the landing location of the ejected ink is detected by the line sensor camera, and the detection results are employed to adjust (correct) the landing location of the ejected ink so that the ejected ink may land to the target landing location. This adjustment method will now be described while referring to FIGS. 13, 14A to 14C, 15A and 15B, 16, 17A and 17B.

Figure 14A:
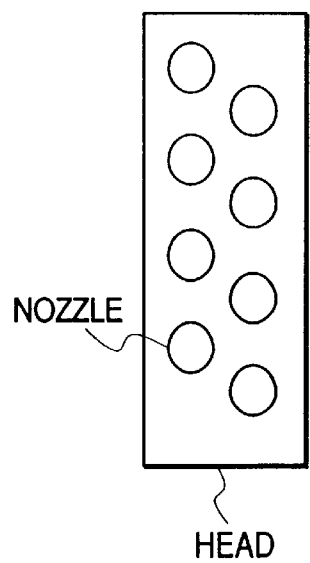
FIGS. 14A, 14B and 14C are diagrams for explaining the adjustment of the landing position of ink ejected onto a target position.
Figure 14B:
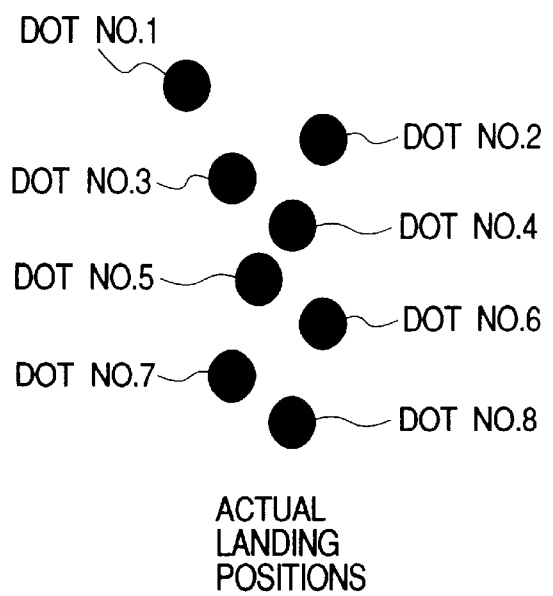
Figure 14C:
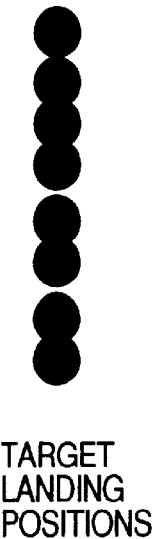
Figure 15A:
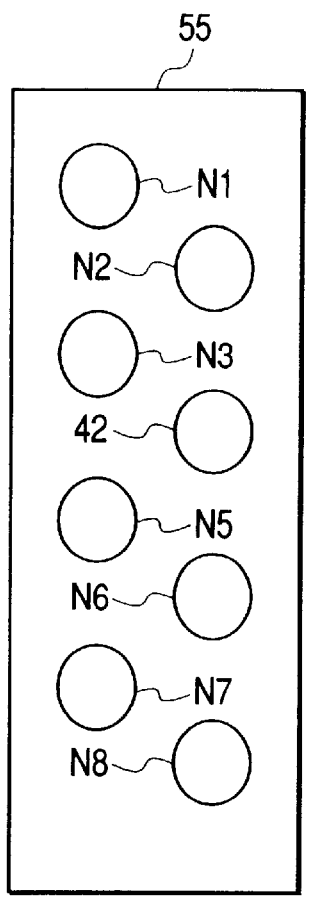
FIGS. 15A and 15B are diagrams showing the difference between the target position to the landing position for each dot.
Figure 15B:
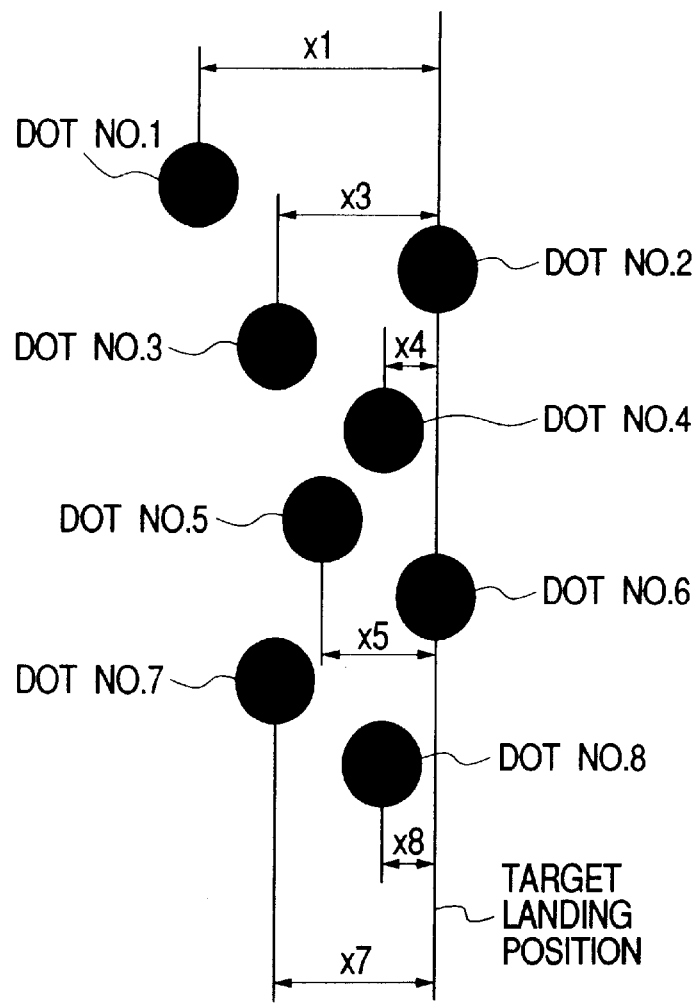

FIG. 13 is a flowchart showing the processing for adjusting the landing location, and FIGS. 14A to 14C are diagrams for explaining the adjustment of the landing position for the ejected ink so that the ejected ink may land to the target location. FIGS. 15A and 15B are diagrams showing the difference (or distance) of the landing location of the ink (hereinafter referred to as a landed dot) away from the target location.

First, at the step S1 in FIG. 13, a zigzag head shown in FIG. 14A, in which nozzles are arranged in a zigzag pattern, is employed, and upon the receipt of an ejection signal transmitted to the individual nozzles of the head using the same timing, ink is simultaneously ejected from these nozzles. The results are shown in FIG. 14B. If there is no positional difference of the discharge orifices or ejection difference, the ink dots (the first ink dots) ejected from the left nozzle array should be formed linearly, as should the ink dots (the second ink dots) ejected from the right nozzle array. Further, the first ink dot array and the second ink dot array are to be arranged in parallel. However, in actuality, the positions of the discharge orifices may be shifted during the production of the ink-jet head, and the viscosity of ink may be changed during the ejection process. These factors prevent the ink from landing at the ideal location. This state is shown in FIG. 14B, and since the landing location of each ink dot is shifted away from the target location, the first ink group, consisting of dot No. 1, dot No. 3, dot No. 5 and dot No. 7, does not form a linear line, and neither does the second ink group, consisting of dot No. 2, dot No. 4, dot No. 6 and dot No. 8. In this embodiment, the zigzag head shown in FIG. 14A is employed; however, an ink-jet head wherein nozzles are linearly arranged (the head in FIG. 8A) can also be employed.

At the step S2, a sensor (observation camera) reads a landing location measurement pattern prepared by the landing of the inks ejected, as shown in FIG. 14B, and measures the landing locations of the ink dots ejected from the nozzles.

At the step S3, the target landing locations shown in FIG. 14C are determined. To determine the landing location, the dot at the landing location farthest from the virtual center line of the ink-jet head is detected, and a linear line running through the dot is determined. This line is used for the target landing locations. In this example, dot No. 2 and dot No. 6 are the ones whose locations are farthest removed from the center line, and a line running through dots No. 2 and No. 6 is defined as the line for the target landing locations. In this example, a linear line running through the dot that is farthest removed from the center line is determined to be as the target landing location; however, the method used for determining the target landing position is not limited to this one. For example, an average value may be obtained for the landing locations, and a linear line running through the average value may be defined as the target landing location.

At the step S4, as is shown in FIG. 15B, the distance from the target landing location is obtained for each ink dot (ejected ink). In this embodiment, the center of gravity for each landed dot is obtained by reading using the CCD camera. Then, the intervals between the target landing locations and the ink dots (dots No. 1 to No. 8), i.e., the distances the dots are shifted away from the target landing locations, are x1, x2, x3, x4, x5, x6, x7 and x8. In this example, x2 and x6 are 0.

At the step S5, the ejection timing is changed in accordance with the distances obtained at step S4 for shifted locations. In this case, the ejection timing is controlled, and thus ejected ink lands at the target locations. The method for controlling the ejection timing will now be described while referring to FIGS. 16, 17A and 17B.

Figure 16:
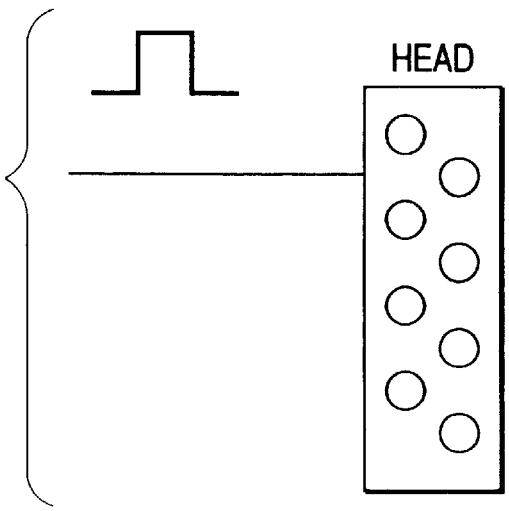
FIG. 16 is a diagram for explaining a conventional ejection control method.

FIG. 16 is a diagram showing a conventional ejection control method. As is apparent from FIG. 16, the same timing is employed by the entire head when an ejection signal is received. Thus, a different ejection timing can not be provided for each nozzle, and accordingly, it is not possible to adjust the landing location of an individual dot.

Figure 17A:
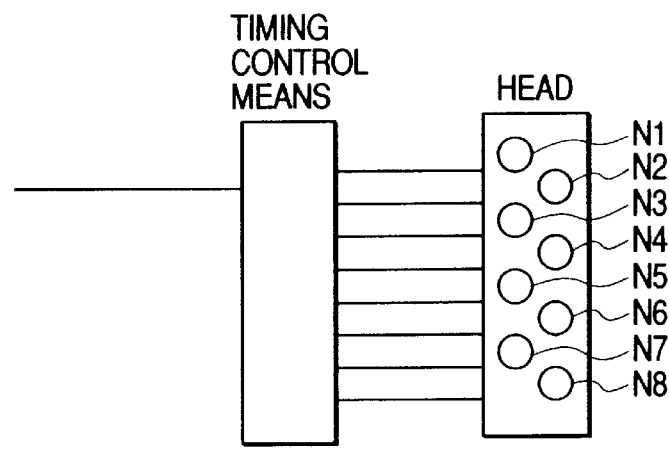
FIGS. 17A and 17B are diagrams for explaining an ejection control method according to the embodiment of the present invention.
Figure 17B:
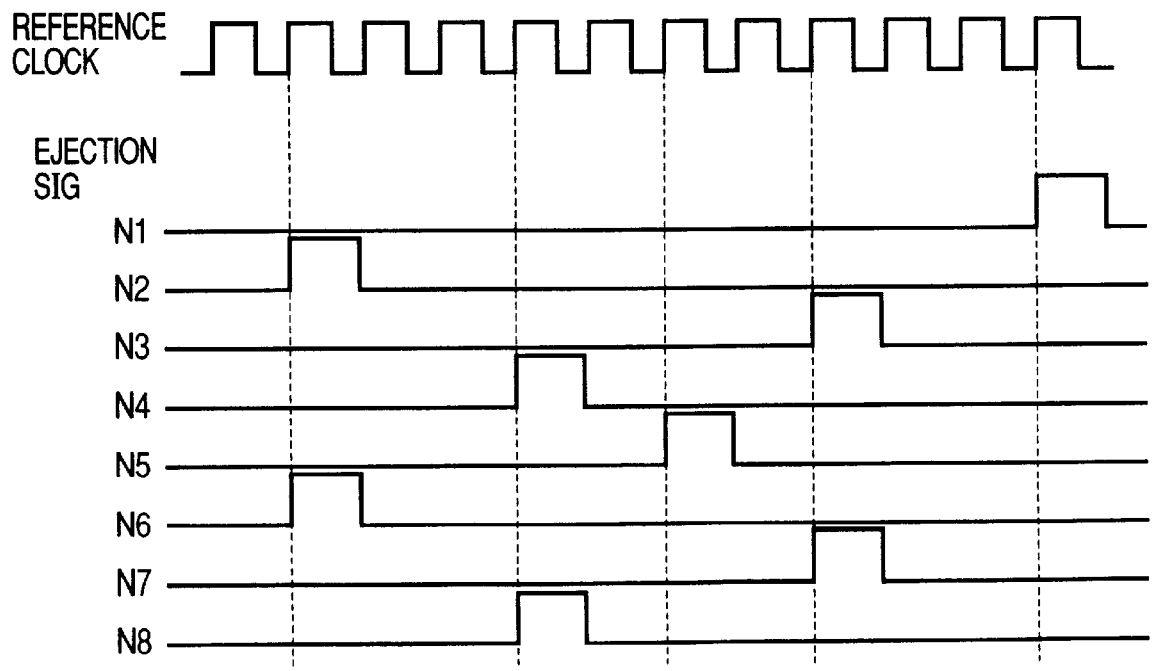

On the contrary, in this embodiment, as is shown in FIGS. 17A and 17B, since optimal timings can be employed for the transmission of ejection signals to individual nozzles, the landing locations of individual dots can be adjusted. In FIG. 17A, the ink-jet head and ejection timing control means are shown. The ejection timing control means, which, it should be noted, constitutes a part of the ejection control unit 70 in FIG. 2, employs independent timings to supply ejection signals to the nozzles (N1 to N8). FIG. 17B is a diagram showing the timings employed for supplying ejection signals to the nozzles N1 to N8, i.e., the ejection timings for the individual nozzles.

While using a specific numeral value, an explanation will now be given for a case wherein the landing locations of the ink dots are shifted as is shown in FIG. 15B. Assume that the values of x1 to x8 are x1=10 μm, x2=0 μm, x3=7 μm, x4=3 μm, x5=5 μm, x6=0 μm, x7=7 μm, and x8=3 μm; and that, when a reference clock is 100 KHz and the speed of the inkjet head relative to the stage is 100 mm/s, the head is moved 1 μm at the above speed per one reference clock pulse.

While taking this into account, the ejection signal is transmitted to the nozzle N2 at a timing that is delayed ten clocks, while the timing for supplying the signal to the nozzle N2 is used as a reference. Thus, ink ejected from the nozzle N1 will land at the target location. This is apparent from FIG. 17B. Similarly, for the nozzle N2 the ejection signal has a zero clock delay; for the nozzle N3, a seven clock delay; for the nozzle N4, a three clock delay; for the nozzle N5, a five clock delay; for the nozzle N6, a zero clock delay; for the nozzle N7, a seven clock delay; and for the nozzle N8, a three clock delay. In this manner, the timing for the supply of the ejection signal to the nozzles N1 to N8 is controlled. As a result, the ejection timings of the nozzles N1 to N8 can be adjusted, and the ink ejected from the nozzles N1 to N8 will land on the target locations.

Following this, the speed of the head relative to the substrate, the distance between the filter elements in direction X and the difference in the ejection timings of the nozzles N1 to N8 are considered, so that the target landing locations correspond to the center line of the filter elements in direction Y, while the nozzles N1 to N8 are controlled as a single nozzle group. Thus, ejected ink lands on the center line of the filter elements in direction Y.

The obtained ejection timing is stored, and is used for actual color filter drawing. When the discharge orifices of the nozzle are angled and the landing locations differ for the forward and rearward movements, the above calculations and measurements are performed separately for the forward and rearward movements. Further, when the landing locations do not differ, the landing locations can also be adjusted by performing a calculation to adjust the ejection timings. In addition, a permissible range may be set in advance for a landing location shift, and when the distance covered by a shift remains within the permissible range, the above process performed to correct the landing location may not be performed.

Figure 18:
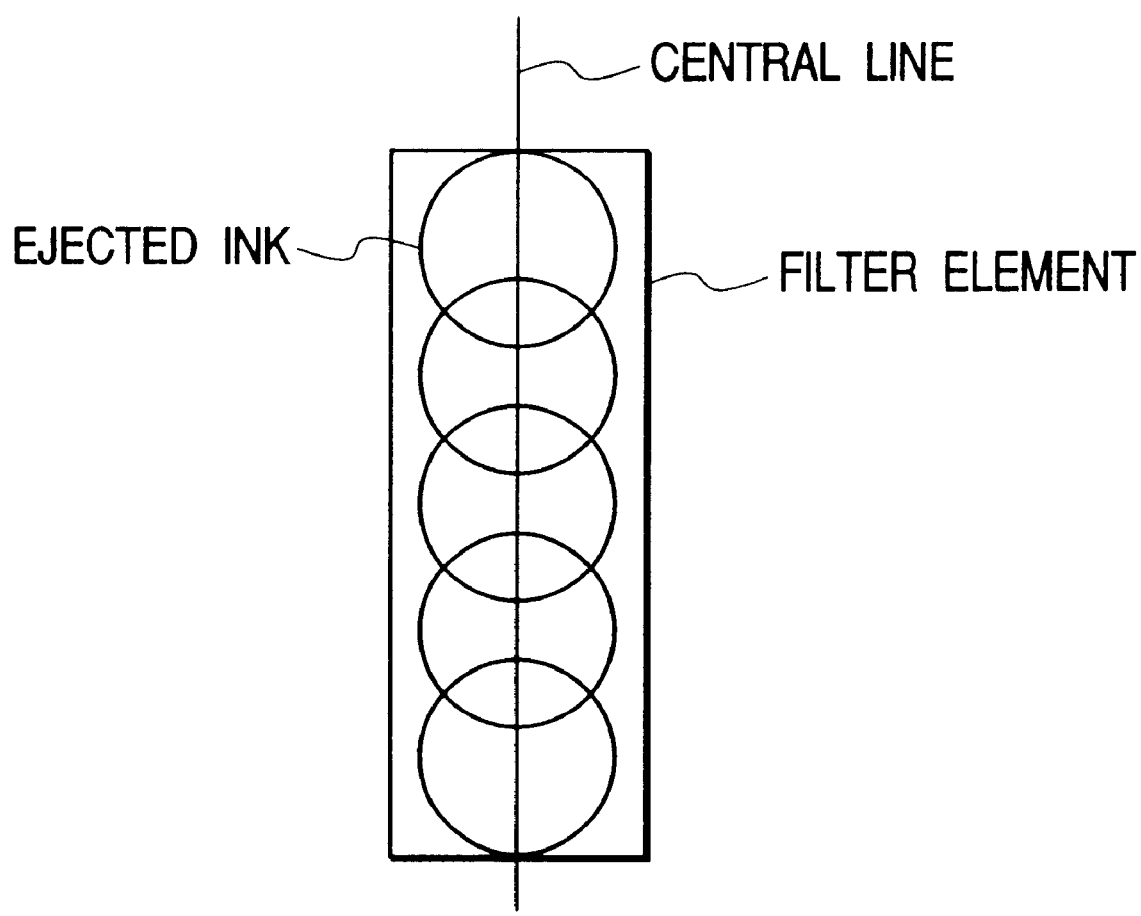
FIG. 18 is a diagram showing the matching of the target ink landing position with the center line of the filter element.

In this embodiment, as is described above, the landing location of ejected ink is controlled by adjusting the ejection timing. The reason why a landing location is adjusted will now be described. In this embodiment, ink is ejected while the ink-jet head is scanned relatively to the substrate in direction X, and thus a color filter having a color pattern shown in FIGS. 8A and 8B is produced. Therefore, the landing location is important, especially in direction X, because, if the ink landing location is shifted in direction X, ink will enter an adjacent filter element having a different color, and color mixing will occur. Thus, the ejection timing for each nozzle is controlled, so that the landing location is not shifted in direction X (the main scanning direction), i.e., the ink lands linearly, in the longitudinal direction (direction Y), in a filter element. It is preferable that the landing location of the ink correspond to the center line in the longitudinal direction of a filter element, as is shown in FIG. 18. That is, the center line is used as the landing location target. Thus, the color mixing that occurs due to landing locations being shifted in direction X can be prevented, and since the ink in a filter element can thus spread out uniformly in direction X, the occurrence of uneven ink densities during coloration can be avoided.

As is described above, when ink is ejected while a head is being moved in the main direction relative to a substrate, while filter elements having colors that differ from those of adjacent filter elements are formed in the main direction, color mixing may occur if ink landing locations are shifter in direction X. Therefore, control should be provided for the ejection timing for each nozzle to prevent the shifting of ejected ink in direction X.

[Determination of Production Conditions, and Coloration of Color Filters]

Figure 19A:
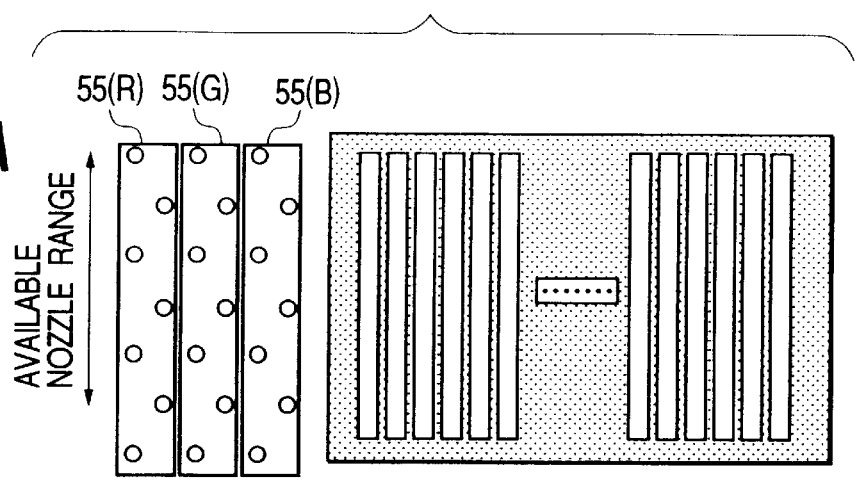
FIGS. 19A, 19B, 19C, 19D, 19E and 19F are diagrams showing the process by which filter elements are formed using multiple ejected ink droplets, while the heads and the substrate are relatively moved multiple times in the X direction.
Figure 19B:
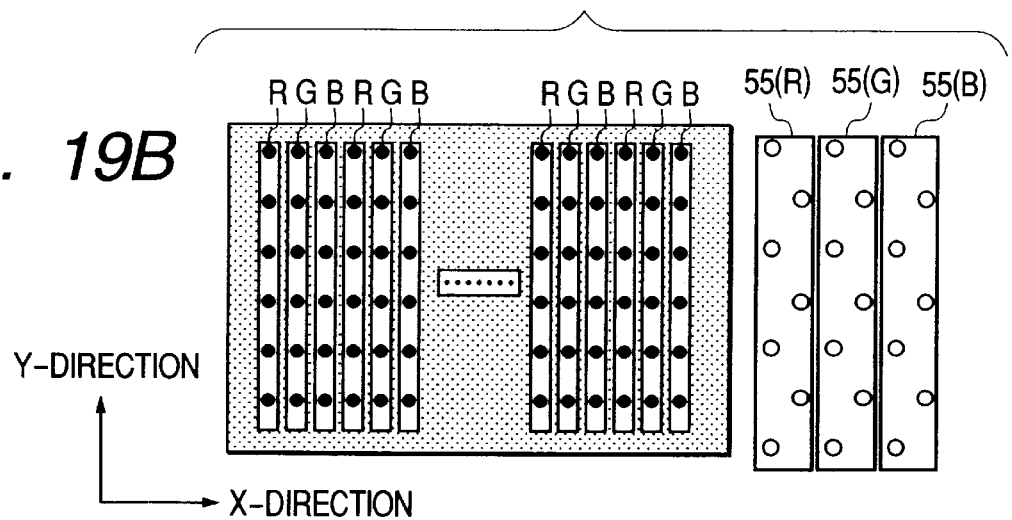
Figure 19C:
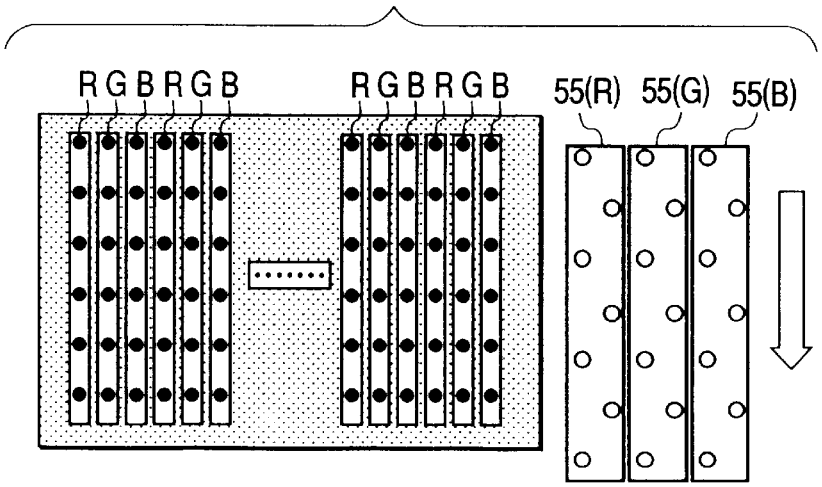
Figure 19D:
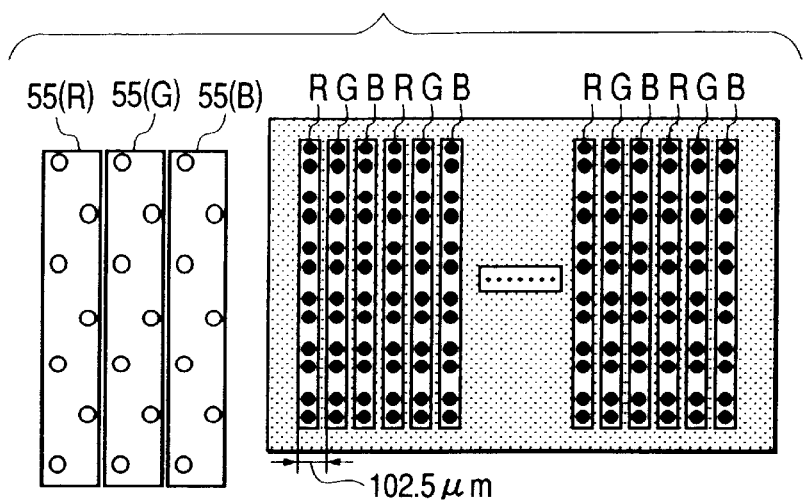
Figure 19E:
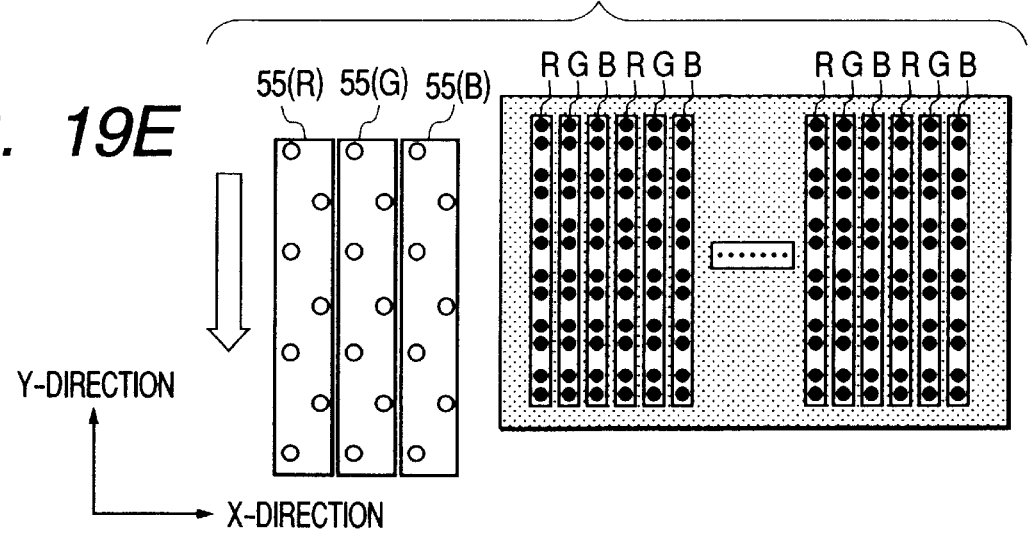
Figure 19F:
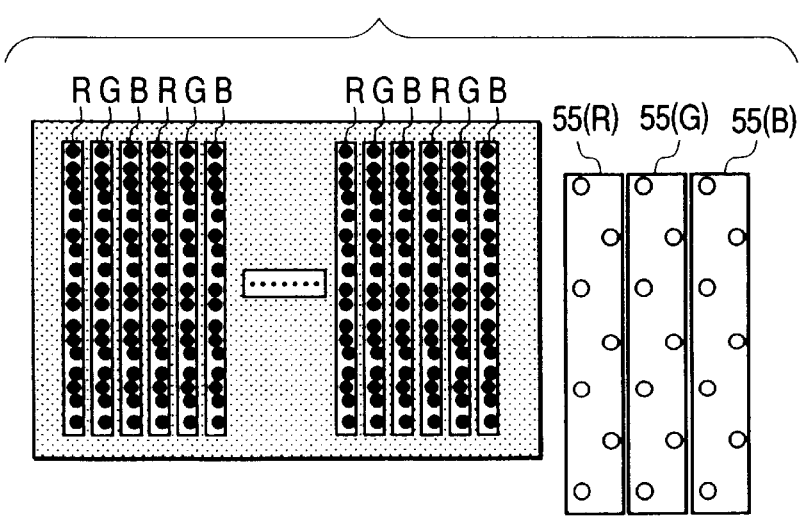
Figure 20:
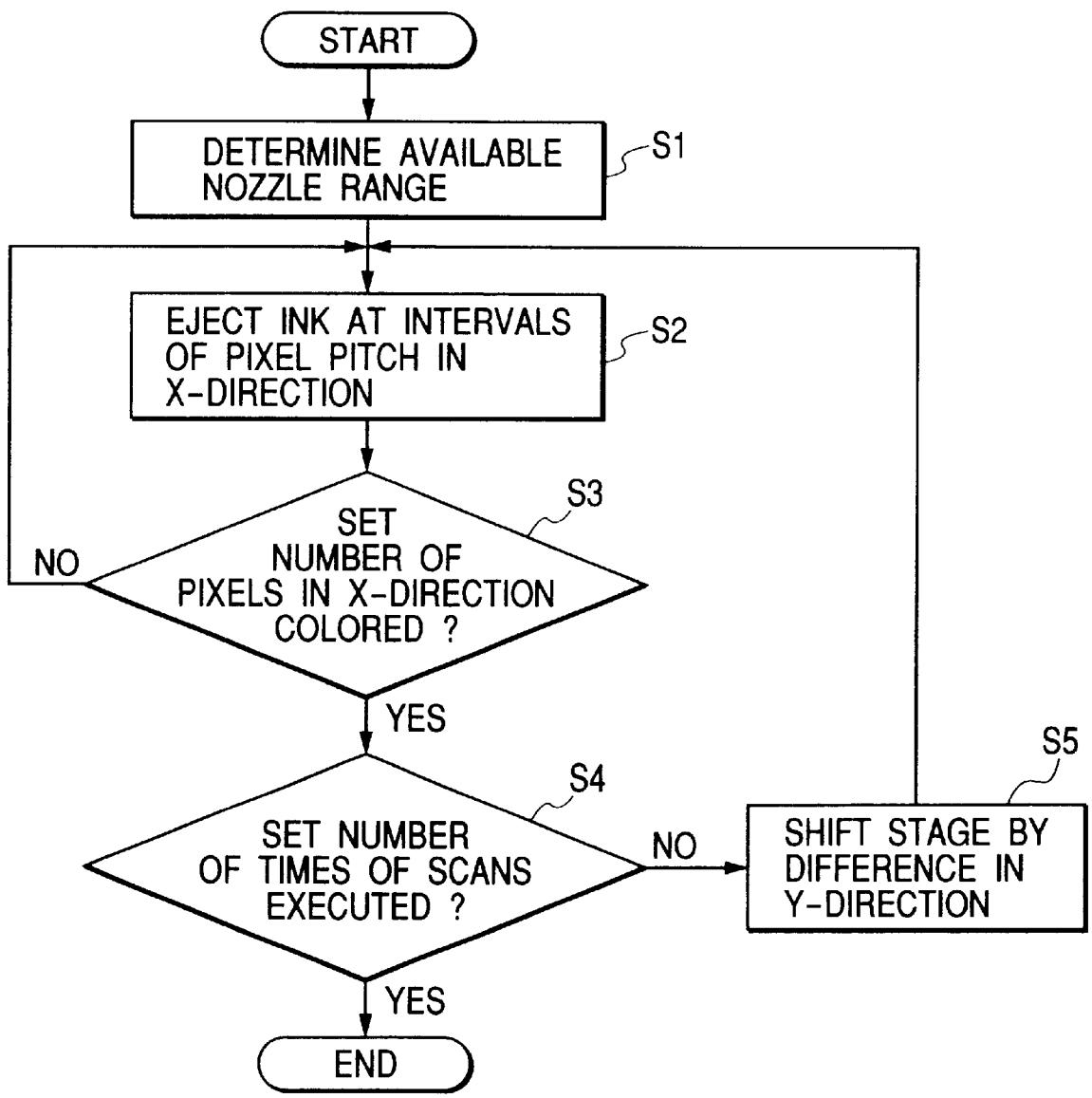
FIG. 20 is a flowchart for the processing performed to color a single color filter.
Figure 21:
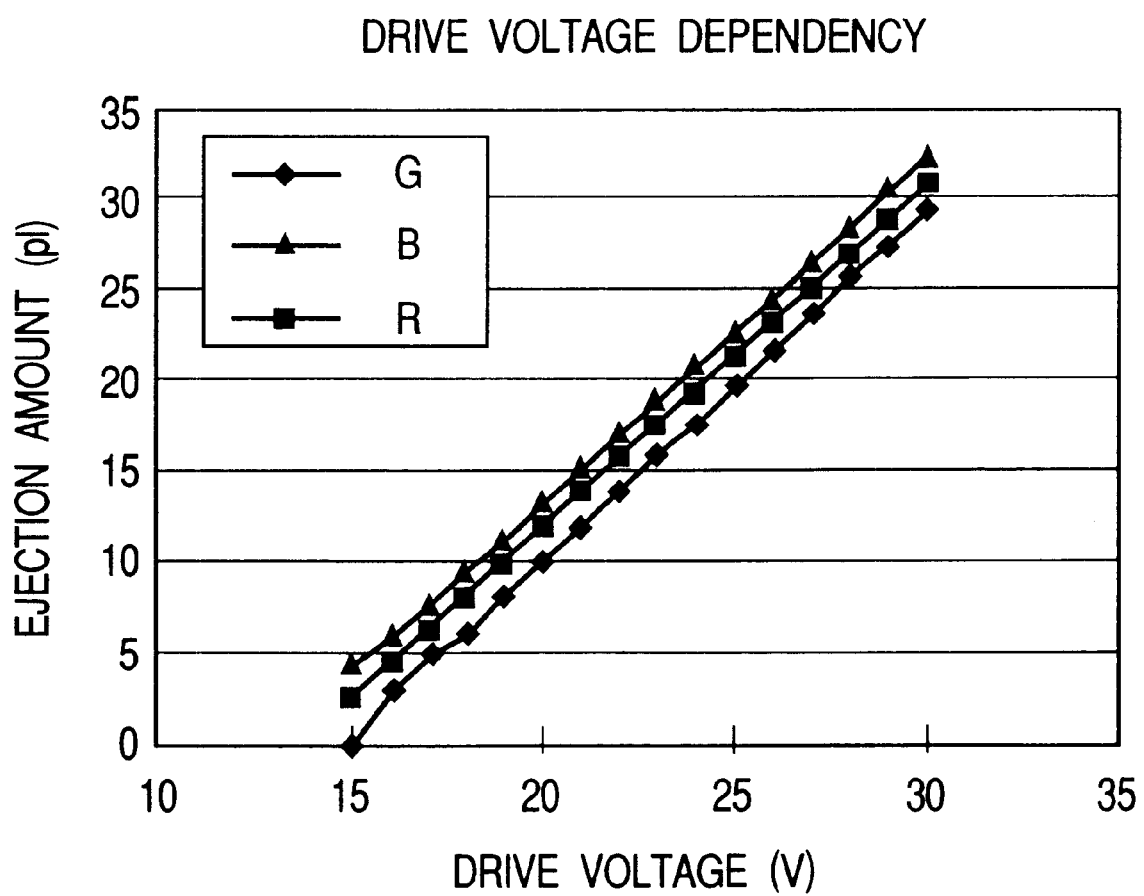
FIG. 21 is a graph showing the relationship between the amount of ink ejected from a nozzle one time and a drive voltage.

The processes at the steps S5 and S6 in FIG. 10 will now be described in detail. At the step S5, optimal production conditions are set in accordance with color filter types, and at step S6, color filters are colored under the production conditions set at step S5. For this explanation, the production of a 12.1 SVGA color filter will be described while referring to FIGS. 19A to 19F, 20 and 21. FIGS. 19A to 19F are diagrams showing the state wherein individual filter elements are formed of multiple ejected ink dots, while relative to the substrate the head is moved multiple times in direction X. The coloration of the filter elements is performed so that the colors in adjacent filter elements differ in direction X. FIG. 20 is a flowchart for the processing performed to color a single color filter, and FIG. 21 is a graph showing the relationship between a drive voltage and the amount of ink for one time of ejection by a nozzle.

First, at step S5, the head drive condition, the number of times of scans, the sub-scanning distance (the shifting distance in direction Y), the available range of the nozzle, etc. are determined as the production conditions. The production conditions are set in advance in accordance with the color filter types, and the setup data are stored as a production condition table in the RAM 68 in FIG. 2. When a color filter is to be produced, data corresponding to the color filter type is read from the production condition table. In addition to the head drive condition, the number of times of scans, the sub-scanning distance (shifting distance in direction Y) and the available range of the nozzle, the pitches of the filter elements of the color filter in direction X and in direction Y, the number of pixels in direction X and in direction Y, and the relative scanning distance between the head and the substrate in direction X (the scanning distance) are also stored as production conditions.

The drive voltage to be applied to the elements in the head is set, for example, as the head drive condition. The drive voltage is so set that the amount of ink for one time of ejection from the nozzle is optimized in accordance with the pixel width in direction X. The number of times of scans, ie., the number of times of movements of the head relative to the substrate in direction X, is set while taking into account the pixel width, the ink ejection volume, and the coloring density of the filter element. The sub-scanning distance (the shifting distance in direction Y), i.e., the distance traveled by the head relative to the substrate in direction Y, is set while taking into account the number of times of scans, the coloring density of the filter element, or the ink density of the ejected ink in the filter element. The available range of the nozzle is set in accordance with the size of the target color filter in direction Y. And when the various production conditions have been set (the step S5 in FIG. 10), the coloration of the color filter is initiated, as is shown in FIGS. 19A to 19F (the step S6 in FIG. 10).

For example, for the production of the 12.1 SVGA color filter, pixel pitch in direction X=102.5 μm, pixel pitch in direction Y=307.5 μm, pixel count in direction X=800, pixel count in direction Y=600, shifting distance in direction Y=24 μm, the number of times of scans=3 and drive voltage=27 V are set as the production conditions. Thereafter, the coloration of the color filter is performed as is shown in FIGS. 19A to 19F. This process will now be described while referring to FIG. 20.

First, at the step S1 in FIG. 20, the available range of the nozzle is determined in accordance with the size in direction Y of the color filter to be produced. This state is shown in FIG. 19A. Then, at the step S2 in FIG. 20, while the XYθ stage 52 is moved substantially perpendicular (direction X) to the direction in which the nozzles of the head are arranged, individually colored inks are sequentially ejected from the heads at the pixel pitch (102.5 μm) in direction X. At the step S3 in FIG. 20, a check is performed to determine whether the 800 pixels in direction X have been colored with the individually colored inks. When the 800 pixels have been colored, program control advances to the step S4. And the ink ejection for the first scanning is terminated. This state is shown in FIG. 19B. When all the 800 pixels have not been colored, program control returns to the step S2 and the ink ejection for the first scanning is continued.

At the step S4, a check is performed to determine whether the scanning was repeated the predetermined number of times (three). When the scanning has not yet been performed the predetermined number of times, program control advances to the step S5, and the XYθ stage 52 is shifted in direction Y a distance equivalent to the predetermined sub-scanning distance (24 μm). This state is shown in FIG. 19C. Thereafter, program control returns to the step S2, and the ejection of ink for the second scanning is performed (FIG. 19D). When the second scanning is completed, the sub-scanning in direction Y is performed (FIG. 19E), and the ink ejection for the third scanning is thereafter initiated (FIG. 19F). When the third scanning has been completed, it is ascertained at the step S4 that the scanning has been repeated the predetermined number of times. Thus, the processing for coloring one color filter is terminated.

Since the amount of ink ejected from each nozzle is adjusted at the step S3 in FIG. 10 so that it is equal, only the same drive voltage need be applied to the elements for the predetermined amount of ink to be ejected from each nozzle. Further, the relationship shown in FIG. 21 between the amount of ink ejected for each color and the drive voltage for each head is obtained in advance, and an optimal amount to be ejected for the color filter that is to be produced is determined in accordance with the relationship. In addition, since the ejection timing for correcting the shifting distance for the landing location is already stored at the step S4 in FIG. 10, before ink is ejected, the stored ejection timing is employed to correct the shifting of the landing location.

[Change of Type of Color Filter to be Produced]

The process at the step S8 in FIG. 10 will now be described. At the step S8, a check is performed to determine whether a color filter of a type different from the type of current color filter that is presently being colored should be produced. When it is ascertained that another color filter type is to be produced, program control returns to step S1, and the production conditions are changed. To change the production conditions, information indicating the type of color filter that is to be produced is entered through a keyboard, and is transmitted to the CPU 22. The CPU 22 reads, from the RAM 68, data concerning the color filter production conditions that correspond to the designated color filter type, and the coloration of the color filter is performed under the new production conditions.

An explanation will now be given for a case wherein the type of color filter currently being produced is changed to another type. Specifically, in this case, the 12.1 SVGA color filter is changed to the 14.1 XGA color filter. To change from the 12.1 SVGA to the 14.1 XGA color filter, the size (screen size) of the color filter and the number of the pixels and the width of pixels are changed. Accordingly, the number of times of scans, the sub-scanning distance (the shifting distance in direction Y) and the amount of ejected ink must be changed. Specifically, the production conditions are changed to pixel pitch in direction X=93 μm, pixel pitch in direction Y=279 μm, number of pixels in direction X=1024, number of pixels in direction Y=768, shifting distance in direction Y=17.5 μm, the number of times of scans=4 and drive voltage=24 V.

When the production conditions for 12.1 SVGA are compared with those for 14.1 XGA, first, the time interval differs because of the different resolutions provided for the pixels of the color filter. That is, since the time interval for the ejection of various colors must be determined in accordance with the pixel pitch, the time interval should be changed when a color filter having a different resolution is to be produced.

Figure 22:
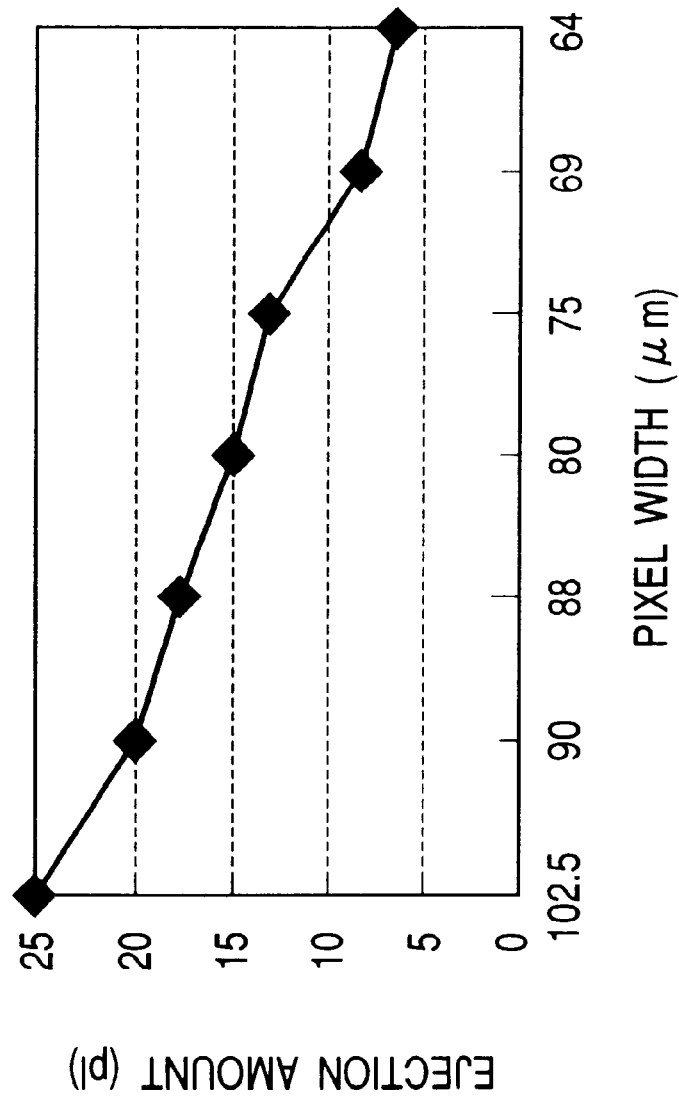
FIG. 22 is a graph showing the relationship between a pixel width and the quantity of ejected ink.
Figure 23:
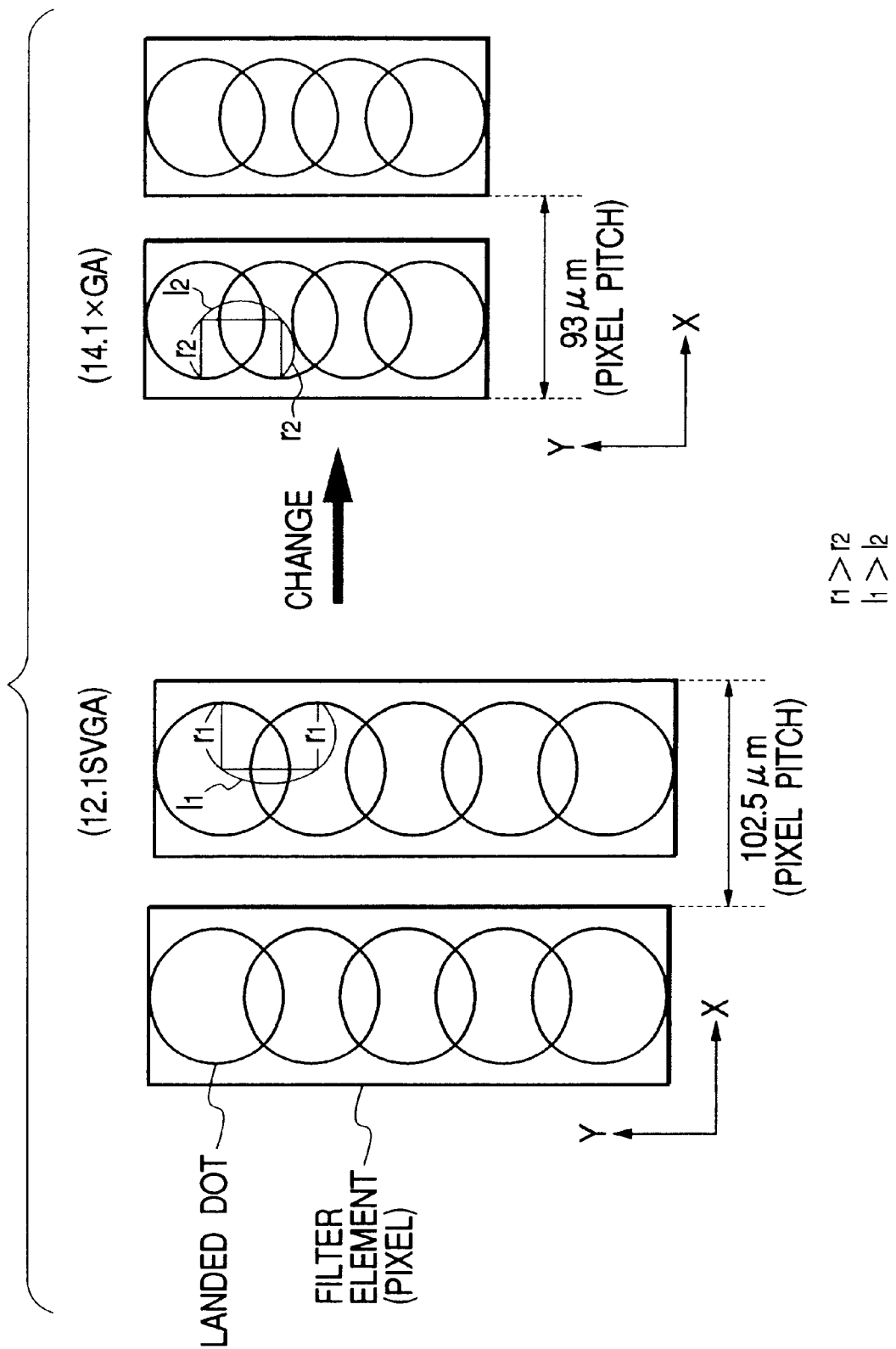
FIG. 23 is a diagram showing the state wherein the quantity of ejected ink is reduced and pixels are colored, as 12.1 SVGA is changed to 14.1 XGA.

Second, the amount of ink for one time of ejection from the nozzle differs because the pixel pitch differs. Specifically, for 12.1 SVGA the pixel pitch in direction X is 102.5 μm, while the pixel pitch for 14.1 XGA, which is 93 μm, is smaller. This means the pixel width is reduced in direction X, and when the pixel width is reduced, accordingly, the amount of ink ejected should also be reduced. This is because, when the amount of ejected ink is unchanged even though the pixel width is smaller, too much ink is supplied, and the ink may overflow and enter a differently colored adjacent pixel, and color mixing may occur. Therefore, for a smaller pixel width, the drive voltage is lowered to reduce the amount of ink ejected. And contrariwise, for a larger pixel width, the drive voltage is raised to increase the amount of ink ejected. As is described above, the amount of ink for one time of ejection from a nozzle is changed in accordance with a change in the resolution of the pixels, i.e., a change in pixel width. According to an experiment conducted by the present inventor, it was found that when the amount of ink ejected was changed in accordance with a change in pixel width, as shown in FIG. 22, a color filter could be colored without color mixing occurring. In FIG. 22, the amount of red (R) ink ejected was is shown. The state wherein pixels were colored using an amount of ink that was reduced in accordance with a change from 12.1 SGVA to 14.1 XGA is shown in FIG. 23. In FIG. 23, $r_1$ is the radius of a dot ejected at a drive voltage of 27 V, and $r_2$ is the radius of a dot ejected at a drive voltage of 24 V. As is apparent from FIG. 21, since the amount of ink ejected is smaller at a lower drive voltage, the radius of a dot is also smaller, and therefore, the relationship $r_1 > r_2$ is established. Further, the distance between the landing locations of the adjacent dots is $1_1 > 1_2$, as is shown in FIG. 23. Thus, as is described above, when a color filter having a different pixel width is to be produced, the amount of ink ejected at one tine from a nozzle must be changed.

Figure 24:
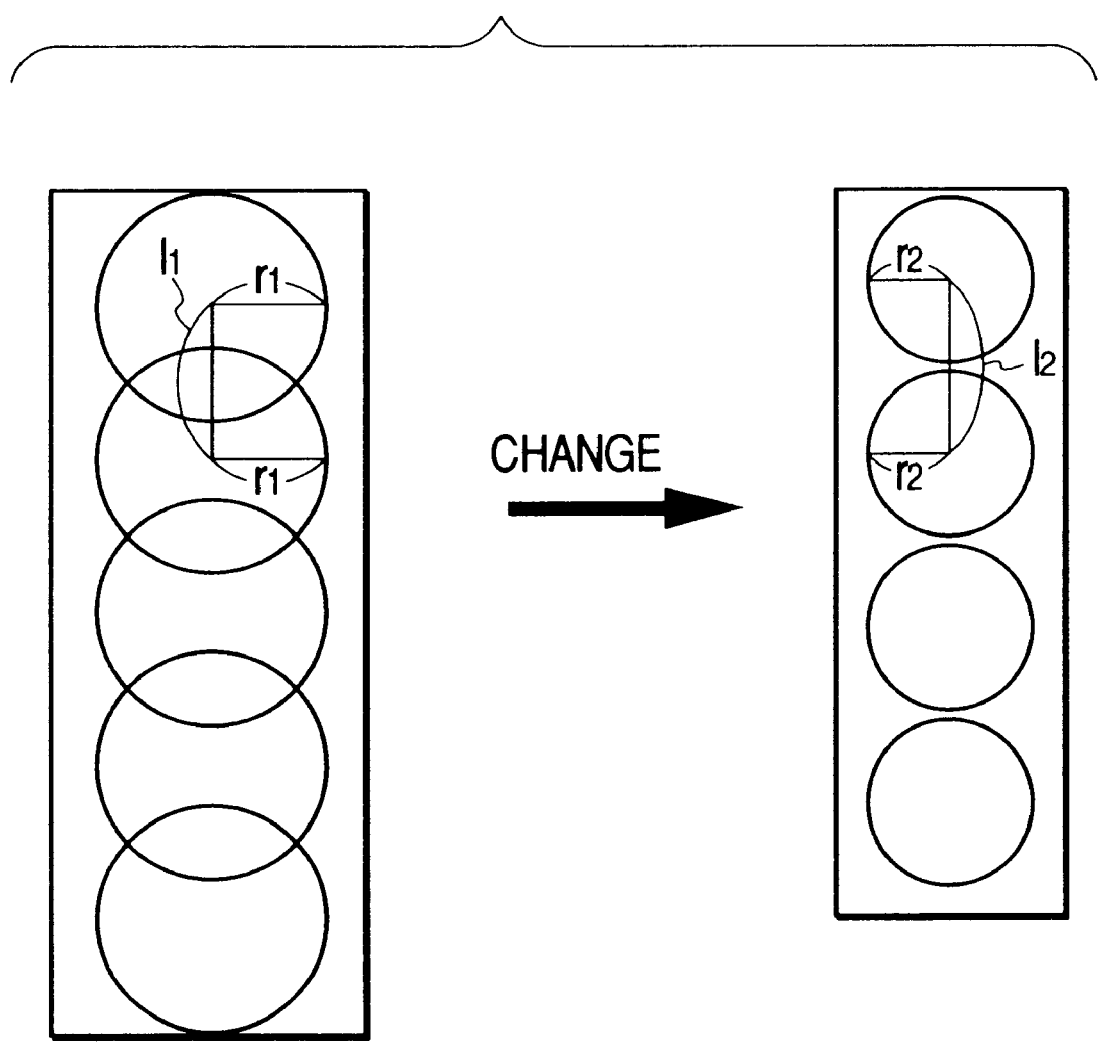
FIG. 24 is a diagram showing the state wherein pixels are colored without changing the landing position intervals, as 12.1 SVGA is changed to 14.1 XGA.
Figure 27A:
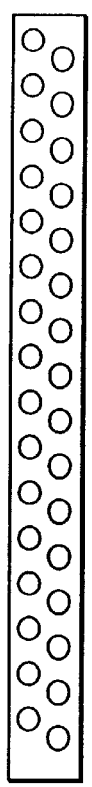
FIGS. 27A, 27B, 27C and 27D are diagrams showing the shape of a head available for the embodiment.
Figure 27B:
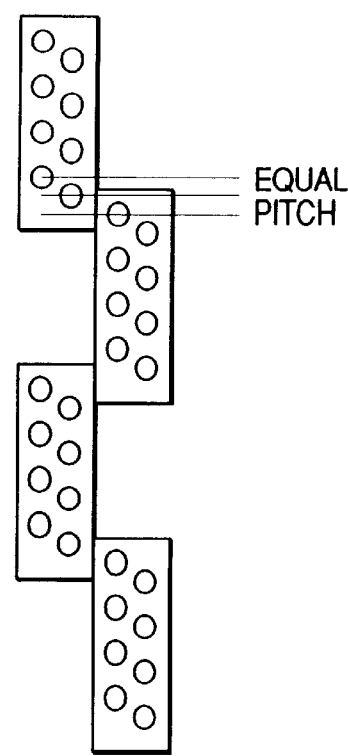
Figure 27C:
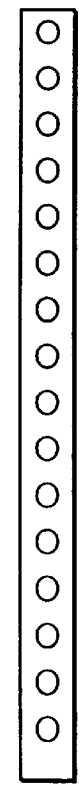
Figure 27D:
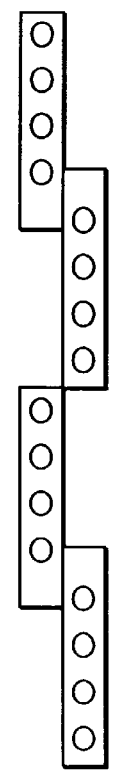

Third, the number of times of scans and the sub-scanning distance differ due to the different pixel widths, and as is described above, as pixel width is changed, the amount of ink for one time of ejection from a nozzle is changed. Specifically, the amount of ink ejected is reduced when 14.1 XGA is designated. Then, when pixels are to be colored using a reduced amount of ink and without the number of times of scans being changed, in most cases, ink is ejected at the same ink ejection density as is allocated for production of 12.1 SVGA, as is shown in FIG. 24. Thus, the total amount of ink applied to the pixels is reduced amount of ink that is required, and as a result, the pixel coloring density is lowered. The pixel coloring density must reach a predetermined level to function as a color filter, and a color filter having pixels at a low coloring density is a defect. Therefore, in order to prevent the occurrence of the defects, the pixel coloring density must be increased. Thus, the distance between the landing locations of the adjacent dots is changed as is shown in FIG. 23. That is, the distance between the landed dots is changed from 11 to 12 to shorten the distance. As a result, the ink ejection density is increased, and the pixels can be colored at a predetermined density. As is described above, when the ink ejection amount is changed, the distance between the landed dots must be changed, and to change the distance, the number of times of scans must be changed. In this embodiment, the number of times of scans is increased. Furthermore, to reduce the distance between the adjacent landed dots, not only the number of times of scans, but also the sub-scanning distance must be changed. And when the sub-scanning distance is changed, the landing interval in direction Y in FIG. 23 can be changed. As is described above, when a color filter having a different pixel width is to be produced, both the number of times of scans and the sub-scanning distance must be changed.

Fourth, the available range of a nozzle in a head and the scan distance in direction X differ because the size of a color filter, i.e., the screen size, differs. When, for example, as is shown in FIGS. 19A to 19F, a head longer than the color filter in direction Y is employed, the available range of the nozzle of the head is defined as being slightly larger than the length of the color filter in direction Y. This is because nozzles that are not used for coloration are specified in advance, and the ejection of ink therefrom is halted. When the available range of nozzles is determined in accordance with the length of the color filter, the use of unnecessary nozzles can be inhibited in advance. And when screen size is changed, i.e., the length in direction Y, as is the number of nozzles used for coloration, and the available range of nozzles is changed. When 12.1 SVGA is changed to 14.1 XGA, the length of a color filter in direction Y is increased, so that the available range of the nozzle is also increased. Further, since the length of the color filter in direction X is also increased, accordingly, the scanning distance required for coloration required in direction X is increased. Furthermore, since the pixel width is increased as the screen size is enlarged, the amount of ink ejected should be increased.

As is described above, when the color filter type is changed from 12.1 SVGA to 14.1 XGA, several production conditions are also changed. And when the color filter of 14.1 XGA is colored under the new production conditions, a high-resolution color filter can be produced.

[Change of Production Condition]

As is apparent from the above description, to produce a variety of different types of color filters, various optimal production conditions must be set in accordance with the color filter type. To set a production condition, consideration must be given to pixel width, color filter size, coloring density, etc. An explanation will now be given, while referring to FIGS. 25 and 26, for those production conditions that should be changed in to conform with a change in the color filter type. FIG. 25 is a diagram showing the parameters for a production condition that is changed in accordance with a change in the color filter type, and FIG. 26 is a diagram showing the information for the screen size, the resolution, the number of pixels and the pixel width of the color filter. It should be noted that ( ) in FIG. 25 is a parameter that is not normally used but that may be used under a specific condition.

First, an explanation will be given for a case wherein the pixel width is changed while the color filter size (screen size) is maintained. For this explanation, VGA, SVGA and XGA color filter types are used, for which different pixel numbers and different pixel pitches are used. Therefore, pixel widths also differ, and as is described above, when pixel widths differ, the amount of ink ejected must be changed. Further, when the amount of ink ejected is changed, it is preferable that the number of times of scans and the sub-scanning distance also be changed. That is, to produce a color filter having a different number of pixels, it is preferable that three parameters, the amount of ink ejected, the number of times of scans and the sub-scanning distance, be changed. Specifically, the number of pixels is increased as in VGA (the number of pixels=640×480)→SVGA (the number of pixels=800×600)→XGA (the number of pixels=1024×768), the amount of ejected ink is reduced, the number of times of scans is increased, and the sub-scanning distance is reduced. When ink that is employed in pixels spreads out very far, the minimum amount of ink that can be used may be fixed, regardless of the screen width, and only two parameters, the number of times of scans and the sub-scanning distance, must be changed.

An explanation will now be given for a change in color filter size (screen size). The sizes 10, 12.1 and 14.1 are used as the color filter sizes, and of these filters, the lengths in direction X and in direction Y differ. And when the length in direction Y is to be changed, because of the above reasons, it is preferable that the available range of the nozzle in the head be changed in accordance with the size of the color filter. Thus, if the length is changed in direction Y, the scanning distance in direction X is also changed. In addition, since the pixel width is changed in accordance with a change in the screen size, the amount of ink ejected must be changed each time the screen size is changed. Specifically, as the screen size is increased, the amount of ink ejected is increased, the number of times of scans is reduced, and the sub-scanning distance is increased. While contrariwise, as the screen size is reduced, the amount of ink ejected is reduced, the number of times of scans is increased, and the sub-scanning distance is reduced. When ink employed in a pixel spreads out very much, the minimum amount of ejected ink that may be used may be fixed, regardless of the screen size, and only two parameters, the number of times of scans and the sub-scanning distance, must be changed.

Next, an explanation will be given for a change in the color density (coloring density) of a color filter. Since the target value for the color density of a color filter differs for each panel maker, the color density must be changed to conform to the requirements for each panel maker, even when a color filter having the same size and the same number of pixels is to be produced. Further, the color reproduction range is more preferable for the color filter having a greater color density; however, since the power consumption of the backlight is limited, the color density of the color filter used for a notebook computer is low, and the color density of a the color filter of monitor type is high. As is described above, the color density differs depending on the application, and when a color filter having a different color density is to be produced, the ink type and the density can be changed. However, when multiple types of ink are prepared in accordance with the color density, the manufacturing cost is increased, and the time required for the ink replacement and the time required for the adjustment accompanied by the replacement are extended. Therefore, in this embodiment, the number of times of scans and the sub-scanning distance are changed, and the ink ejection density injected to the pixels is changed in order to match the color density and the target value. Specifically, to increase the color density, the number of times of scans is increased and the sub-scanning distance is reduced so as to increase the ink ejection density. To reduce the color density, the number of times of scans is reduced and the sub-scanning distance is increased so as to reduce the ink ejection density. With this method, only the number of times of scans and the sub-scanning distance need be changed, without the type of ink that is used being changed, and a color filter having a different color density can be produced. Thus, the preparation accompanying a change in the color density can be performed easily within a short period of time and at a low cost. In this embodiment, the amount of ink ejected is unchanged; however, when the type of ink is changed, the amount of ink ejected may be changed in accordance with the characteristic of the ink.

As is described above, since the production conditions corresponding to the color filter type are set in advance, even when the type of color filter to be produced is changed, the target color filter can be produced without requiring much time for preparation. Further, since a complicated apparatus arrangement is not required, the manufacturing costs are not raised. Furthermore, since the nozzle pitch of the ink-jet head need not match the pixel pitch, the preparation accompanying a change of the color filter can be easily performed. As a result, the operating ratio of the apparatus and productivity can be considerably improved.

This embodiment can be variously corrected or modified without departing from the scope of the invention. For example, to relatively scan the ink-jet head and the substrate, the XYθ stage may be moved in direction X or Y while the ink-jet head is fixed, or only the ink-jet head may be moved while the XY stage is fixed. Further, the amount of ink ejected may be adjusted by changing only one of the drive voltage, the drive pulse width and the drive pattern, or by using a combination of them. In addition, the ink-jet ejection method applicable for the embodiment may be either a so-called bubble-jet method or a piezoelectric method. And further, for the ink-jet head of this embodiment one of a linear array head in which nozzles are arranged substantially linearly, a zigzag array head in which nozzles are arranged in a zigzag manner, a long head, and an assembly wherein multiple short heads are arranged may be employed (steps 27A to 27D).

In this embodiment, the landing location is adjusted each time the color filter type is changed. However, the landing location may be adjusted, as needed. For example, when the amount of ink ejected is changed, or when deterioration of the ink-jet head occurs as time elapses, the land location is adjusted.

Furthermore, in the above description, only the data concerning the production condition for the color filters for 12.1 SVGA and 14.1 XGA have been employed. However, in actuality, data concerning the production conditions corresponding to all types of color filters shown in FIG. 26 are stored in the production condition table.

Figure 34A:
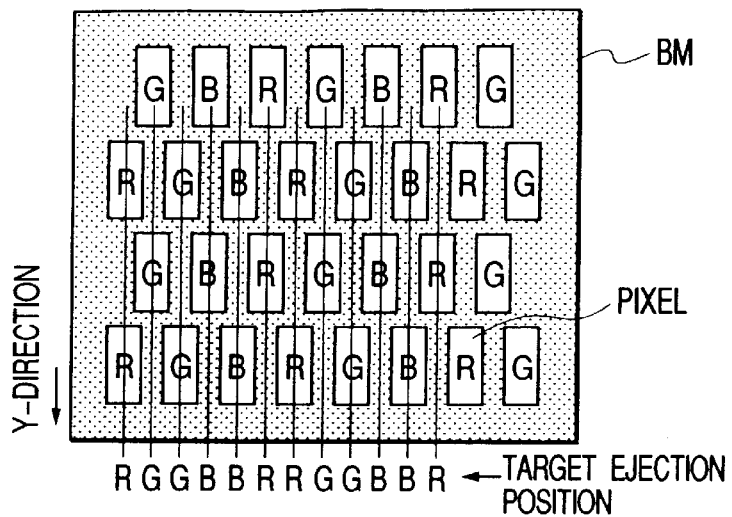
FIGS. 34A, 34B and 34C are diagrams for explaining the process used to manufacture multiple types of color filters.
Figure 34B:
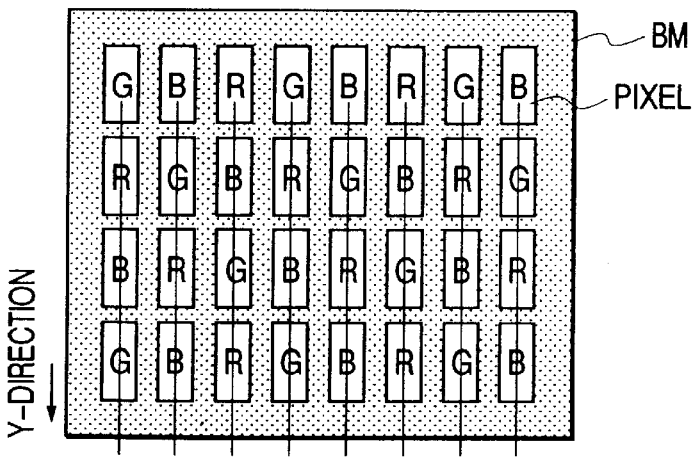
Figure 34C:
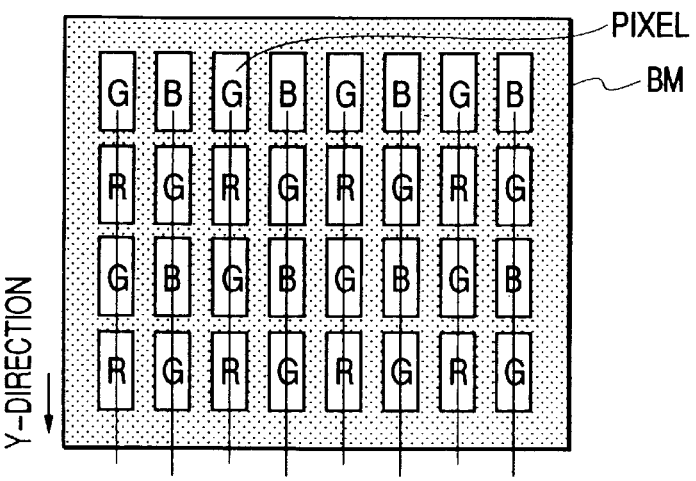

In addition, a color filter having the color pattern shown in FIG. 8A or 8B has been produced. However, the present invention is not limited to these application, and can be applied for the production of a variety of color filters (delta type, mosaic type and square type) shown in FIGS. 34A to 34C. To produce these color filters, the ejection timing is also controlled so that the ink dots of individual colors land along the center line of each filter element in the longitudinal direction (direction Y).

Figure 28:
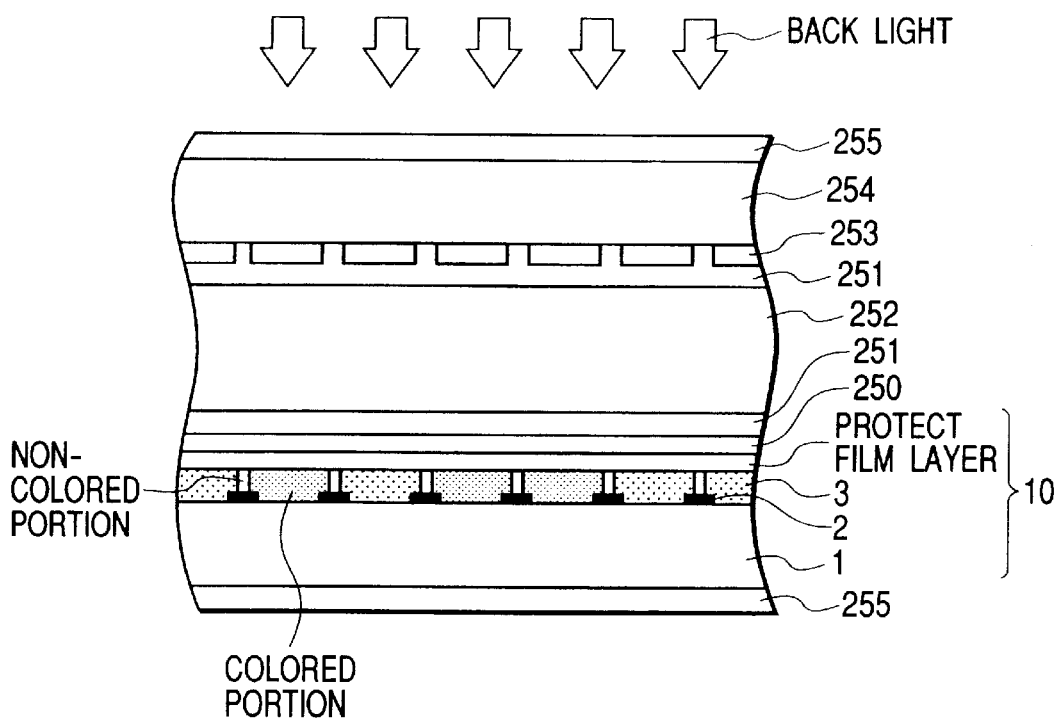
FIG. 28 is a cross-sectional view of the basic arrangement of a color liquid crystal display device in which the color filter of this embodiment is mounted.

FIG. 28 is a cross-sectional view of the basic structure of the display screen of a color liquid crystal display device 30 in which the above described color filter is mounted.

The display screen includes a light polarization plate 11, a glass transparent substrate 1, the black matrixes 2, the resin composition layer 3, the protective layer 8, a common electrode 16, an orientation film 17, a liquid crystal compound 18, an orientation film 19, pixel electrodes 20, a glass substrate 21, the light polarization plate 22, and a backlight 23. The components 1, 2, 3, 8, 11, 16 and 17 constitute a color filter 53 described above, and the components 19 to 22 constitute an opposed substrate 24.

In the color liquid crystal display device 30, the color filter 53 and the opposed substrate 24 are aligned, with the liquid compound 18 sandwiched in between, and the transparent pixel electrode 20 inside the substrate 21 and opposite the color filter 53 has a matrix shape. The color filter 53 is so located that R, G and B pixels are arranged at the positions of the pixel electrodes 20.

Further, the orientation films 17 and 19 are formed inside the substrates 1 and 21, and by rubbing the orientation films 17 and 19 liquid crystal molecules can be aligned in a specific direction. The light polarization plates 11 and 22 are adhered respectively to the outer faces of the substrates 1 and 21, and the liquid crystal compound 18 is used to fill the gap between the substrates 1 and 21. A combination of a fluorescent light and a scattering plate (neither shown) is generally employed as the backlight 23, and provides a display by using the liquid crystal compound 18 as a light shutter for changing the transmittance of light emitted by the backlight 23.

Figure 29:
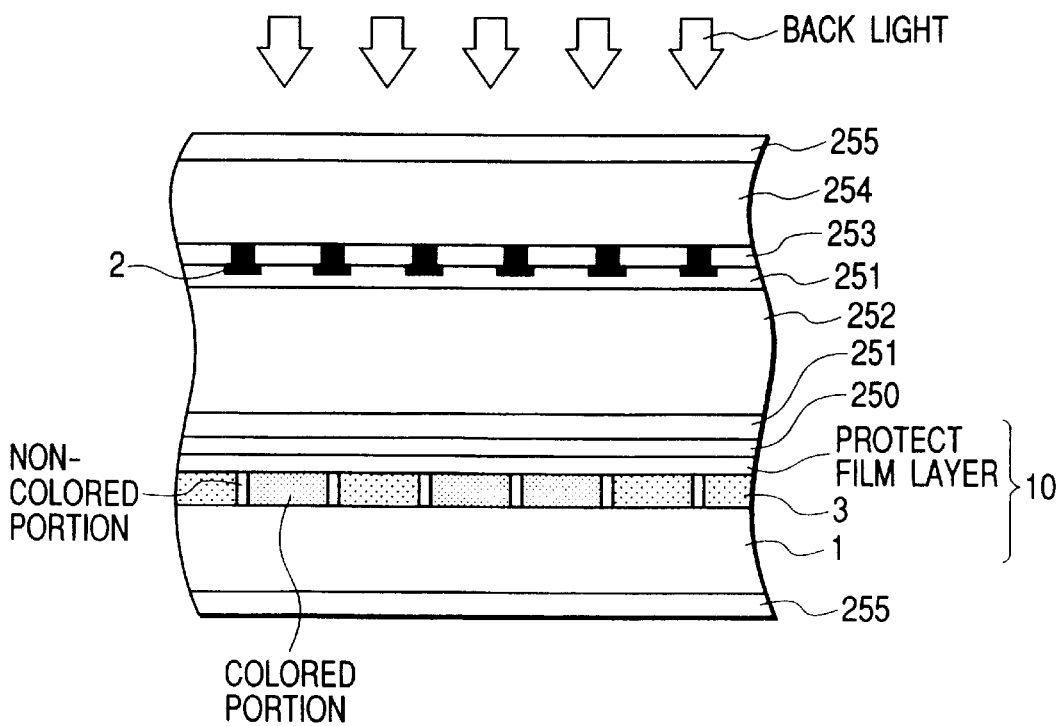
FIG. 29 is a cross-sectional view of the basic arrangement of another color liquid crystal display device in which the color filter of this embodiment is mounted.

In FIG. 28, the black matrixes 2 are formed on the substrate 1 side. However, the present invention is not limited to this arrangement, and the black matrixes 2 may be formed on the glass substrate 21 in the opposed substrate 24 (FIG. 29).

An explanation will now be given, while referring to FIGS. 30 to 32, for a case wherein the liquid crystal display device 30 is used for an information processing apparatus.

Figure 30:
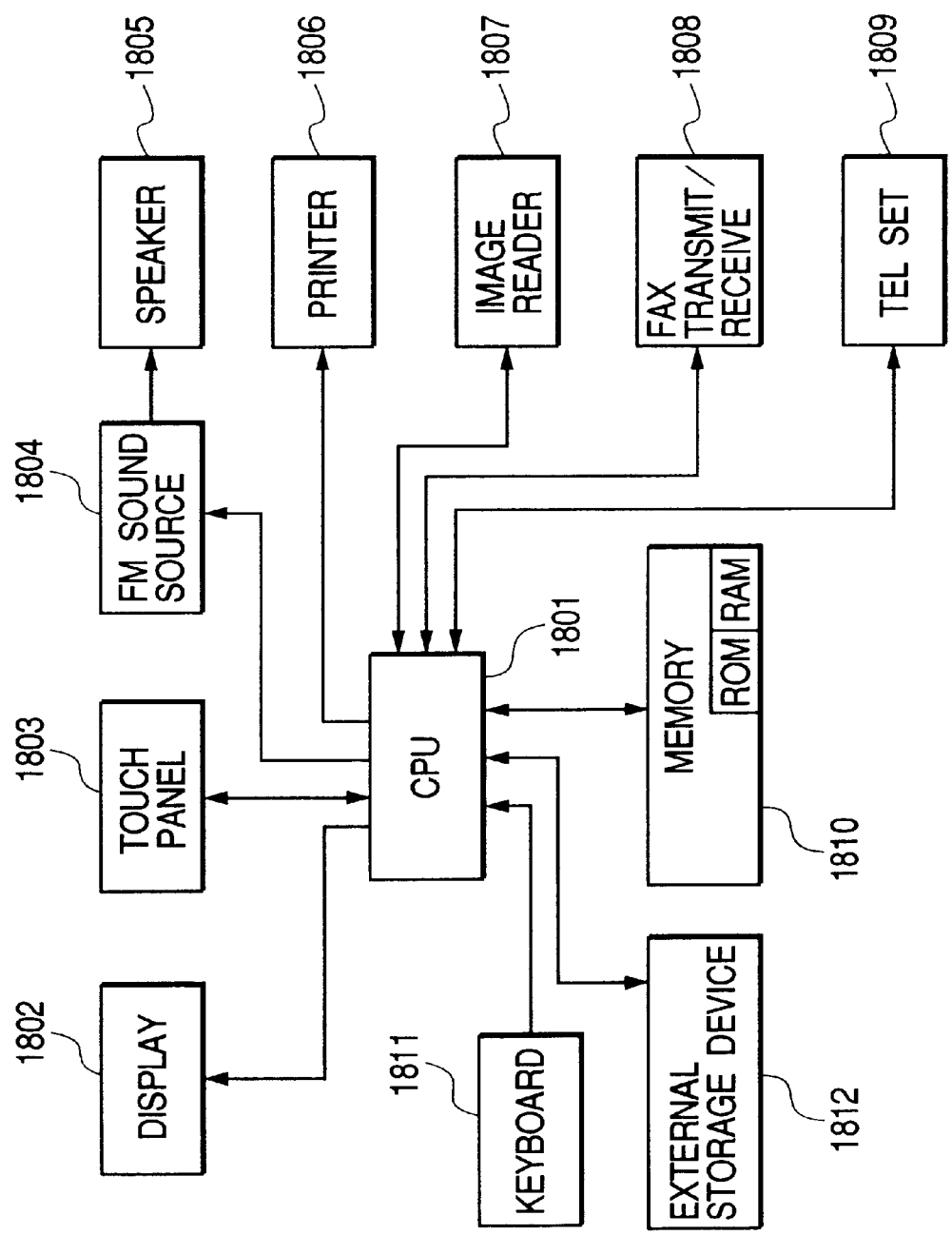
FIG. 30 is a schematic block diagram showing the arrangement when the liquid crystal display device is used for an information processing apparatus.

FIG. 30 is a schematic block diagram showing the configuration when the liquid crystal display device 30 is used for an information processing apparatus that functions as a word processor, a personal computer, a facsimile machine and a copier.

In FIG. 30, a control unit 1801, which controls the entire apparatus, includes a CPU, such as a microprocessor, and various I/O ports, and outputs a control signal and a data signal to the individual sections, or receives signals from them. A display device 1802 displays, on the display screen, various menus, document information and image data read by an image reader 1807. A transparent pressure sensitive touch panel 1803 is provided on the display device 1802, and by pressing the surface of the touch panel 1803 with, for example, a finger, the input of data for items and coordinates can be executed on the display device 1802.

From a memory 1810 or an external storage device 1812 storing, as digital data, music information prepared by a music editor, the digital data is read, and FM-modulated in an FM (Frequency Modulation) sound source 1804. An electric signal emitted by the FM sound source 1804 is converted into audible sound, which is released through a loudspeaker 1805. A printer 1806 is used as the output terminal for a word processor, a personal computer, a facsimile machine or a copier.

The image reader 1807 photo-electrically reads and obtains document data. The image reader 1807 is provided along the document feeding path, and reads various types of document, such as facsimile documents and copy documents.

A facsimile (FAX) transmitter/receiver 1808 transmits by facsimile document data obtained by the image reader 1807 and receives and decodes facsimile signals, and serves as an interface for an external device. A telephone set 1809 has various telephone functions, such as a general telephone function and an answering function.

The memory 1810 includes a ROM used to store a system program, a manager program, another application program, character fonts and a dictionary, and a video RAM used to store an application program loaded from the external storage device 1812 and document data. A keyboard 1811 is used to enter document data and various commands. The external storage device 1812 is a storage medium, such as a floppy disk or a hard disk, for storing document data, music or sound data and an application program for a user.

Figure 31:
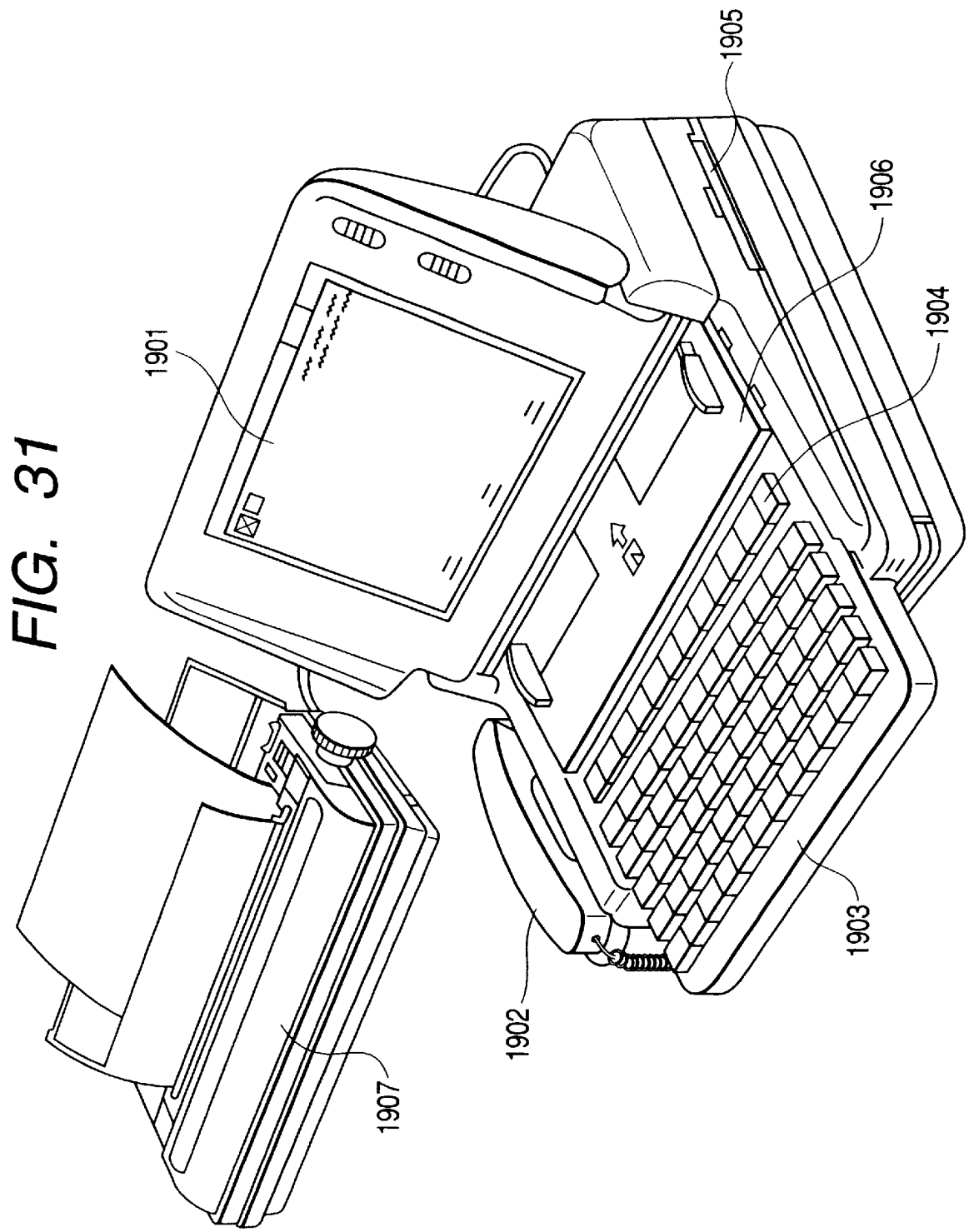
FIG. 31 is a diagram showing the information processing apparatus wherein the liquid crystal display device is used.

FIG. 31 is a specific diagram showing the external appearance of the information processing apparatus in FIG. 30.

In FIG. 30, a flat display panel 1901 using the liquid display device is used to display various menus, graphic information and document data. The input of data for items and coordinates can be executed on the display 1901 by pressing the surface of the touch panel 1803 with, for example, a finger. A handset 1902 is used when the apparatus is employed as a telephone, and a keyboard 1811, which is connected to the main body and is removable, can be used for various text functions and for the entry of a variety of data. Multiple function keys 1904 are also provided on the keyboard 1811, while an insertion slot 1905 is used to load a floppy disk, which is one type of the external storage device 1812.

A paper mounting unit 1906 is a portion whereat a documents are set up for reading by the image reader 1807; these documents, after being read, are discharged from the rear of the apparatus. While for facsimile reception, an ink-jet printer 1907 is provided for the printing of data.

When the information processing apparatus functions as a personal computer or as a word processor, various data entered at the keyboard 1811 are processed by the control unit 1801 in accordance with a predetermined program, and are output as an image by the ink-jet printer 1806.

When the information processing apparatus is used as the receiver for the facsimile machine, facsimile data received by the FAX transmitter/receiver 1808 via a communication line are processed by the control unit 1801 in accordance with a predetermined program, and are output as an image from the printer 1806.

When the information processing apparatus functions as a copier, the image reader 1807 reads the document, and the obtained document data is transmitted from the control unit 1801 to the printer 1806, where it is output as a copy image. And when the information processing apparatus functions as a receiver for the facsimile machine, the document data read by the image reader 1807 is processed by the control unit 1801 in accordance with a predetermined program, and is transmitted along a communication line to the FAX transmitter 1808.

Figure 32:
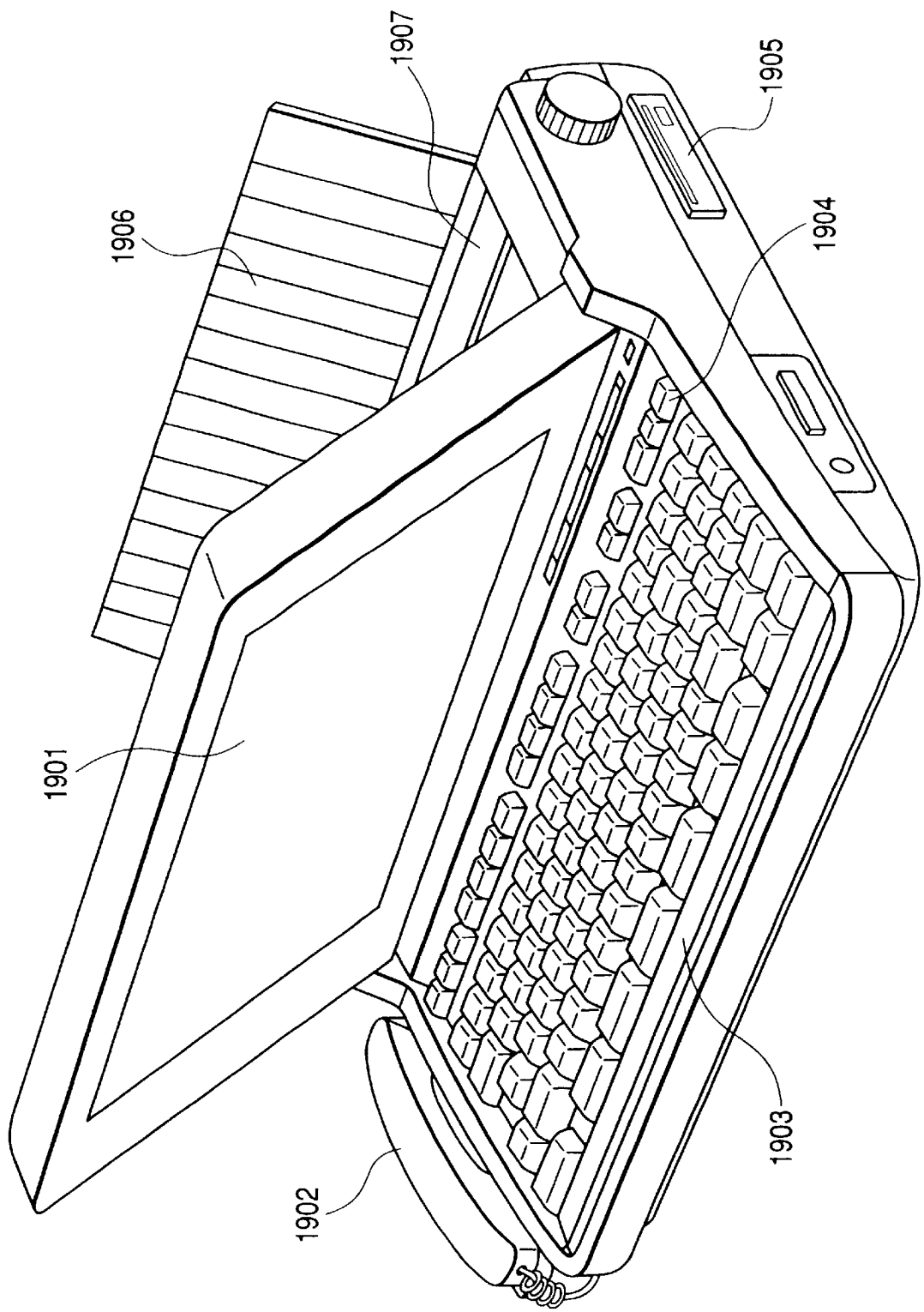
FIG. 32 is a diagram showing another information processing apparatus wherein the liquid crystal display device is used.

The above information processing apparatus can incorporate the ink-jet printer 1806, as is shown in FIG. 32, and in this case, the portability is improved. In FIG. 32, the same reference numerals that are used in FIG. 31 are used to denote sections having the same functions, and no explanation for them will be given.

For the present invention, an explanation has been given for a printing apparatus of an ink-jet recording type that especially includes means for generating thermal energy used for ink ejection (e.g., an electro-thermal converting element or a laser beam), and for changing the state of ink by using the thermal energy. With this printer, recording densities and resolutions can be increased.

It is preferable that the basic arrangement or principle disclosed in, for example, U.S. Pat. Nos. 4,723,129 and 4,740,796 be employed for the ink-jet recording. This ink-jet recording system can be used for either a so-called on-demand type or a continuous type. Specifically, the ink-jet recording system is effective for the on-demand type. According to this type, when an electro-thermal converting element is located in correlation with the sheet adhering liquid (ink) and a liquid path, and at least one drive signal, which corresponds to recorded information and which dramatically raises the temperature beyond the film boiling point, is provided for the electro-thermal converting element. Thus, the electro-thermal converting element generates thermal energy, and causes film boiling on the heat acting face of the recording head, so that as a result, an air bubble can be formed in liquid (ink) upon the receipt of a single drive signal. The liquid (ink) is ejected through the discharge orifice by an increase or a reduction in the size of the air bubble, and at least one droplet is formed. It is preferable that a pulse-shaped drive signal be employed, because an appropriate increase or reduction in the size of the air bubble occurs immediately, and an especially superior liquid (ink) ejection response can be achieved.

An appropriate pulse-shaped drive signal is disclosed in U.S. Pat. Nos. 4,463,359 and 4,345,262. It should be noted that when the condition described in U.S. Pat. No. 4,313,124 concerning a temperature rise on the heat acting face is employed, a superior recording can be performed.

The arrangement of the recording head of the present invention includes not only the structure wherein the discharge orifices, the liquid path, and the electro-thermal converting element are employed (linear liquid flow path, or a right-angled liquid flow path), as in the above USP specifications, but also the structure described in U.S. Pat. Nos. 4,558,333 or 4,459,600 wherein the heat acting face is located at a bent area. In addition, the present invention may have a structure based on the arrangement disclosed in Japanese Patent Application Laid-open No. 59-123670, wherein a common slot is used as the discharge orifice for multiple electro-thermal elements, or the structure Japanese Patent Application Laid-open No. 59-138461, wherein an opening for absorbing a pressure wave produced by the thermal energy is position in correlation with the discharge orifice.

Furthermore, a recording head of a full-line type that has a length corresponding to the maximum width of the color filter substrate may be used as the structure disclosed in the above prior art, wherein the length is satisfied by the employment of multiple recording heads, or may be provided as a single, integrally formed recording head.

Further, a chip type recording head may be employed, so that when the recording head is attached to the color filter producing apparatus, the electrical connection to the main body of the apparatus and the supply of ink therefrom is carried out, or a recording head of a cartridge type, with which an ink tank is integrally formed, may be employed.

It is preferable that the recovery means for the recording head and extra auxiliary means be provided as constituents of the color filter producing apparatus, because then the effects provided by the invention will be more stable. Specifically, the provision of capping means, cleaning means and pressure application or absorption means for the recording head, heating means, such as the electro-thermal converting element, another heating element or a combination of these elements, and the provision of an extra ejection mode for performing ink ejection other than for recording are effective for ensuring stable recording.

According to the above described embodiment, fluid ink has been employed as the liquid. However, ink that is solidified at room temperature or lower, or ink that can be softened or liquefied may be employed. That is, so long as the ink is a liquid when a recording signal is received, any ink can be employed.

In addition, ink that is normally solid and is liquefied by heating may be employed, so that a temperature rise due to the thermal energy is aggressively prevented by using the thermal energy to change the state of the ink from solid to liquid, or to prevent evaporation of the ink. The present invention can be applied for a case wherein the liquefying of ink is started upon the application of thermal energy; for example, a case wherein ink is liquefied upon the receipt of a thermal energy recording signal, and liquid ink is ejected. Or a case wherein the solidification of ink has already begun by the time the ink reaches the recording medium. As is disclosed in Japanese Patent Application Laid-open No. 54-56847 or 60-71260, this type of ink may be stored as a liquid or a solid in recessed portions or through holes in a porous sheet, and the sheet may be located opposite the electro-thermal converting element. In this invention, the most effective recording head for the above described ink types is the one that performs the film boiling process.

The present invention may be applied for a system constituted by multiple apparatuses, or a system including only one apparatus. Further, the present invention can be achieved for supplying a program for carrying out the invention using a system or an apparatus. In this case, the storage device on which the program related to the invention is stored constitutes the present invention. When the program is loaded from the storage medium into the system or the apparatus, the system or the apparatus is operated in accordance with the program.

As above-mentioned, according to the present invention, the shift in the loading location of ink ejected from each nozzle is measured in advance and the landing location is adjusted so as to eliminate the shift. Therefore, the present invention can improve the throughput and reduce the manufacturing costs.

What is claimed is:

1. A color filter producing method for producing a color filter by ejecting onto a substrate ink from an ink-jet head having a plurality of nozzles arranged substantially in a first direction while relatively scanning said ink-jet head and said substrate in a second direction substantially perpendicular to said first direction, so that filter elements adjacent in said second direction may be colored to have different colors, said method comprising:

a main scanning step of relatively scanning said ink-jet head and said substrate in said second direction;

a coloring step of ejecting inks, during said main scanning, from plural different nozzles of said ink-jet head, and coloring said filter elements with the plural ink dots; and an adjustment step of measuring, before said coloring, landing locations for said plural ink dots to be ejected to color said filter elements, and of employing the measurement results to adjust the difference of said landing locations, wherein, at said adjustment step, the positioning difference in said second direction is measured, and ejection timings for said plural nozzles are adjusted so that said plural ink dots land along the center line of each of said filter elements in said first direction.

2. A color filter producing method according to claim 1, wherein said adjustment step includes:

a first adjustment step of adjusting said ejection timings of said multiple nozzles, so that said plural ink dots land linearly relative to target locations in said first direction; and a second adjustment step of adjusting the ejection timing for a nozzle group composed of said plural nozzles, so that said target locations match the center lines of said filter elements in said first direction.

3. A color filter producing method, according to claim 1 or 2, that before said adjustment step further comprises:

an ink ejection amount adjustment step for substantially equalizing the quantities of inks ejected from said nozzles.

4. A color filter producing method according to claim 1, wherein said filter elements are colored with plural ink dots ejected while said ink-jet head and said substrate perform one time of relative scan.

5. A color filter producing method according to claim 1, wherein said filter elements are colored with plural ink dots ejected while said ink-jet head and said substrate perform plural times of relative scans.

6. A color filter producing method according to claim 1, wherein each of said filter elements is colored with plural ink dots ejected from plural different nozzles.

7. A color filter producing method according to claim 1, wherein the longitudinal direction of said filter elements is said first direction.

8. A color filter producing method according to claim 1, wherein among said plural ink dots that land in each of said filter elements in said first direction, at least two ink dots land at substantially the same time.

9. A color filter producing method according to claim 1, wherein said filter elements are so colored that said filter elements arranged in said first direction have the same color.

10. A color filter producing method according to claim 1, wherein said ink-jet head is a head for ejecting ink using thermal energy, and includes a thermal energy generation element for generating thermal energy to be applied to ink.

11. A color filter producing method according to claim 1, wherein said ink-jet head is a head for ejecting ink using a piezoelectric device that is deformed upon the application of a voltage.

12. A color filter producing apparatus for producing a color filter by ejecting onto a substrate ink from an ink-jet head having a plurality of nozzles arranged substantially in a first direction while relatively scanning said ink-jet head and said substrate in a second direction substantially perpendicular to said first direction, so that filter elements adjacent in said second direction may be colored to have different colors, said apparatus comprising:

main scanning means for relatively scanning said ink-jet head and said substrate in said second direction;

coloring means for ejecting inks, during said main scanning, from plural different nozzles in said ink-jet head, and for coloring said filter elements with plural ink dots; and adjustment means for measuring landing locations for said plural ink dots to be ejected to color said filter elements, and for employing the measurement results to adjust the difference of said landing locations, wherein said adjustment means performs the adjustment before said filter elements are colored by said control means, and wherein said adjustment means measures the positioning difference in said second direction, and adjusts ejection timings for said plural nozzles so that said plural ink dots land along the center line of each of said filter elements in said first direction.

13. A color filter producing apparatus according to claim 12, wherein said adjustment means adjusts said ejection timings of said plural nozzles, so that said plural ink dots land linearly relative to target locations in said first direction, and wherein said adjustment means adjusts the ejection timing for a nozzle group composed of said plural nozzles, so that said target locations match the center lines of said filter elements in said first direction.

14. A color filter producing apparatus according to claim 12 or 13, further comprising:

ink ejection amount adjustment means for substantially equalizing the quantities of inks ejected from said nozzles, wherein said ink ejection amount adjustment means adjusts the quantity of ink before the adjustment by said landing location adjustment means is performed.

15. A color filter producing apparatus according to claim 12, wherein said filter elements are colored with plural ink dots ejected while said ink-jet head and said substrate perform one time of relative scan.

16. A color filter producing apparatus according to claim 12, wherein said filter elements are colored with plural ink dots ejected while said ink-jet head and said substrate perform plural times of relative scans.

17. A color filter producing apparatus according to claim 12, wherein each of said filter elements is colored with plural ink dots ejected from plural different nozzles.

18. A color filter producing apparatus according to claim 12, wherein the longitudinal direction of said filter elements is said first direction.

19. A color filter producing apparatus according to claim 12, wherein among said plural ink cots that land in each of said filter elements in said first direction, at least two ink dots land at substantially the same time.

20. A color filter producing apparatus according to claim 12, wherein said filter elements are so colored that said filter elements arranged in said first direction have the same color.

21. A color filter producing apparatus according to claim 12, wherein said ink-jet head is a head for ejecting ink using thermal energy, and includes a thermal energy generation element for generating thermal energy to be applied to ink.

22. A color filter producing apparatus according to claim 12, wherein said ink-jet head is a head for ejecting ink using a piezoelectric device that is deformed upon the application of a voltage.

23. A method for producing a display device having a color filter, said color filter being produced by ejecting on a substrate ink from an ink-jet head having a plurality of nozzles arranged substantially in a first direction, while relatively scanning said ink-jet head and said substrate in a second direction substantially perpendicular to said first direction so that filter elements adjacent in said second direction may be colored to have different colors, said method comprising:

a preparing step of preparing a color filter produced by executing a main scanning step of relatively scanning said ink-jet head and said substrate in said second direction, a coloring step of ejecting ink, during said main scanning step, from plural different nozzles of said ink-jet head, and coloring said filter elements with the plural ink dots, and an adjustment step of measuring, before said coloring step, landing locations for said plural ink dots to be ejected to color said filter elements, and of employing the measurement results to adjust the difference of said landing locations, wherein said adjustment step includes the steps of measuring the positioning difference in said second direction, and adjusting ejection timings for said plural nozzles so that said plural ink dots land along the center line of each of said filter elements in said first direction; and an integrating step of integrally forming a light quantity varying means and said color filter.

24. A method for producing an apparatus including a display device having a color filter, said color filter being produced by ejecting on a substrate ink from an ink-jet head having a plurality of nozzles arranged substantially in a first direction, while relatively scanning said ink-jet head and said substrate in a second direction substantially perpendicular to said first direction so that filter elements adjacent in said second direction may be colored to have different colors, said method comprising:

a preparing step of preparing a display device integrally forming therein a light quantity varying means and a color filter produced by executing a main scanning step of relatively scanning said ink-jet head and said substrate in said second direction, a coloring step of ejecting ink, during said main scanning step, from plural different nozzles of said ink-jet head, and coloring said filter elements with multiple ink dots, and an adjustment step of measuring, before said coloring step, landing locations for said plural ink dots to be ejected to color said filter elements, and of employing the measurement results to adjust the differing of said landing locations, wherein said adjustment step includes the steps of measuring the positioning difference in said second direction, and adjusting ejection timings for said plural nozzles so that said plural ink dots land along the center line of each of said filter elements in said first direction; and a connecting step of connecting, to said display device, an image signal supply means for transmitting an image signal to said display device.

* * * * *

UNITED STATES PATENT AND TRADEMARK OFFICE
CERTIFICATE OF CORRECTION

PATENT NO. : 6,645,029 B2
DATED : November 11, 2003
INVENTOR(S) : Makoto Akahira It is certified that error appears in the above-identified patent and that said Letters Patent is hereby corrected as shown below:

<u>Title page,</u>
Item [57], ABSTRACT,
Line 13, "direction.¶" should read -- direction. --.

<u>Column 4,</u>
Line 58, "embodiment" should read -- embodiments --.

<u>Column 9,</u>
Line 23, "is" should be deleted.

<u>Column 10,</u>
Line 48, "scams," should read -- scans, --.

<u>Column 13,</u>
Line 62, "like" should read -- line --.

<u>Column 16,</u>
Line 55, "shifter" should read -- shifted --.

<u>Column 19,</u>
Line 29, "was" should be deleted;
Line 42, "tine" should read -- time --; and
Line 63, "11 to 12" should read -- $1_1$ to $1_2$ --.

<u>Column 28,</u>
Line 31, "cots" should read -- dots --.

Signed and Sealed this

Fifteenth Day of June, 2004

JON W. DUDAS
*Acting Director of the United States Patent and Trademark Office*